United States Patent
Park et al.

(10) Patent No.: US 11,792,419 B2
(45) Date of Patent: Oct. 17, 2023

(54) IMAGE ENCODING/DECODING METHOD AND DEVICE FOR PERFORMING PREDICTION, AND METHOD FOR TRANSMITTING BITSTREAM INVOLVING WEIGHTED PREDICTION AND BIDIRECTIONAL OPTICAL FLOW

(71) Applicant: LG Electronics Inc., Seoul (KR)

(72) Inventors: Nae Ri Park, Seoul (KR); Jung Hak Nam, Seoul (KR); Hyeong Moon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 17/677,410

(22) Filed: Feb. 22, 2022

(65) Prior Publication Data
US 2022/0239937 A1  Jul. 28, 2022

Related U.S. Application Data

(63) Continuation of application No. PCT/KR2020/011103, filed on Aug. 20, 2020.
(Continued)

(51) Int. Cl.
*H04N 19/46* (2014.01)
*H04N 19/105* (2014.01)
(Continued)

(52) U.S. Cl.
CPC .......... *H04N 19/46* (2014.11); *H04N 19/105* (2014.11); *H04N 19/159* (2014.11);
(Continued)

(58) Field of Classification Search
CPC .... H04N 19/46; H04N 19/105; H04N 19/159; H04N 19/174; H04N 19/176; H04N 19/70
See application file for complete search history.

(56) References Cited

U.S. PATENT DOCUMENTS

2013/0243093 A1* 9/2013 Chen ............... H04N 19/597
                                                    375/240.16
2018/0332298 A1 11/2018 Liu et al.
(Continued)

FOREIGN PATENT DOCUMENTS

WO  WO2021034123  2/2021

OTHER PUBLICATIONS

Bross et al., "Versatile Video Coding (Draft 6)," JVET-O2001, Presented at Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.
(Continued)

*Primary Examiner* — Francis Geroleo
(74) *Attorney, Agent, or Firm* — Fish & Richardson P.C.

(57) ABSTRACT

An image encoding/decoding method and apparatus are provided. An image decoding method according to the present disclosure is performed by an image decoding apparatus. The image decoding method comprises deriving a first flag specifying whether to perform weighted prediction on a current block and a weight index BcwIdx of bi-prediction with CU-level weight (BCW) for the current block, determining whether to perform default weighted prediction or explicit weighted prediction on the current block based on the first flag and BcwIdx, and generating a prediction block for the current block by performing the determined method.

12 Claims, 21 Drawing Sheets

Related U.S. Application Data

(60) Provisional application No. 62/890,573, filed on Aug. 22, 2019.

(51) Int. Cl.
  *H04N 19/159* (2014.01)
  *H04N 19/174* (2014.01)
  *H04N 19/176* (2014.01)
  *H04N 19/70* (2014.01)

(52) U.S. Cl.
  CPC ......... *H04N 19/174* (2014.11); *H04N 19/176* (2014.11); *H04N 19/70* (2014.11)

(56) References Cited

U.S. PATENT DOCUMENTS

| | | | |
|---|---|---|---|
| 2018/0376166 A1 | 12/2018 | Chuang et al. | |
| 2019/0230350 A1* | 7/2019 | Chen | H04N 19/139 |
| 2020/0336749 A1* | 10/2020 | Li | H04N 19/109 |
| 2021/0058634 A1* | 2/2021 | Li | H04N 19/176 |
| 2022/0014735 A1* | 1/2022 | Chen | H04N 19/159 |
| 2022/0038720 A1* | 2/2022 | Hashimoto | H04N 19/105 |

OTHER PUBLICATIONS

Chen et al., "Non-CE2: Gbi inheritance for constructed affine merge candidate," JVET-N481-v6, Presented at Joint Video Experts Team (JVET) of ITU-T SG 16 WP 3 and ISO/IEC JTC 1/SC 29/WG 11, 14th Meeting: Geneva, CH, Mar. 19-27, 2019, 4 pages.

Hashimoto et al., "Non-CE4: Weighted prediction with BDOF and bi-prediction with CU weights harmonization," JVET-M0067-v1, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 6 pages.

Park et al., "Non-CE4 : Simplifications on BCW index derivation process," JVET-O0366, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 5 pages.

Ye et al., "AHG13: On bi-prediction with weighted averaging and weighted prediction," JVET-M0111-v2, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 7 pages.

Indian Office Action in Indian Appln. No. 202217014341, dated Sep. 28, 2022, 5 pages.

* cited by examiner

— 4x4 block
--- 6x6 surrounding region
→ Samples & gradients padding

IMAGE ENCODING/DECODING METHOD AND DEVICE FOR PERFORMING PREDICTION, AND METHOD FOR TRANSMITTING BITSTREAM INVOLVING WEIGHTED PREDICTION AND BIDIRECTIONAL OPTICAL FLOW

CROSS-REFERENCE TO RELATED APPLICATIONS

Pursuant to 35 U.S.C. § 119(e), this application is a continuation of International Application PCT/KR2020/011103, with an international filing date of Aug. 20, 2020, which claims the benefit of U.S. Provisional Patent Application No. 62/890,573, filed on Aug. 22, 2019, the contents of these prior applications are hereby incorporated by reference herein in their entirety.

TECHNICAL FIELD

The present disclosure relates to an image encoding/decoding method and apparatus and a method of transmitting a bitstream, and, more particularly, to an image encoding/decoding method and apparatus for performing weighted prediction in consideration of prediction refinement with optical flow (PROF), and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for performing weighted prediction.

Another object of the present disclosure is to provide an image encoding/decoding method and apparatus for performing weighted prediction or bi-prediction with CU-level weight (BCW) in consideration of PROF.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure may comprise deriving a first flag specifying whether to perform weighted prediction on a current block and a weight index BcwIdx of bi-prediction with CU-level weight (BCW) for the current block, determining whether to perform default weighted prediction or explicit weighted prediction on the current block based on the first flag and BcwIdx, and generating a prediction block for the current block by performing the determined method.

In the image decoding method according to the present disclosure, the first flag may be differently determined based on a slice type of a current slice, to which the current block belongs.

In the image decoding method according to the present disclosure, the first flag may be derived as a value of pps_weighted_pred_flag signaled at a picture parameter set (PPS), based on the slice type of the current slice being a P slice, and the first flag may be derived as a value of pps_weighted_bipred_flag signaled at the PPS, based on the slice type of the current slice being a B slice.

In the image decoding method according to the present disclosure, BcwIdx may be derived based on a syntax element bcw_idx signaled through a bitstream, and BcwIdx may be derived as 0 based on bcw_idx being not present in the bitstream.

In the image decoding method according to the present disclosure, bcw_idx may be parsed from the bitstream based on a weighted prediction flag of a reference picture of the current block.

In the image decoding method according to the present disclosure, bcw_idx may be parsed from the bitstream based on all weighted prediction flags of a reference picture of the current block being 0.

In the image decoding method according to the present disclosure, default weighted prediction may be performed on the current block, based on the first flag being 0 or BcwIdx being not 0.

In the image decoding method according to the present disclosure, explicit weighted prediction may be performed on the current block, based on the first flag being 1 or BcwIdx being 0.

In the image decoding method according to the present disclosure, the default weighted prediction may perform BCW or average sum based on BcwIdx.

In the image decoding method according to the present disclosure, average sum may be performed on the current block based on BcwIdx being 0, and BCW may be performed on the current block based on BcwIdx being not 0.

In the image decoding method according to the present disclosure, the explicit weighted prediction may be performed based on weighting parameters (weight and offset) for a reference picture of the current block.

In the image decoding method according to the present disclosure, the weighting parameters may be explicitly signaled through a bitstream.

An image decoding apparatus according to another aspect of the present disclosure may comprise a memory and at least one processor. The at least one processor may derive a first flag specifying whether to perform weighted prediction on a current block and a weight index BcwIdx of bi-prediction with CU-level weight (BCW) for the current block, determine whether to perform default weighted prediction or explicit weighted prediction on the current block based on the first flag and BcwIdx, and generate a prediction block for the current block by performing the determined method.

An image encoding method according to another aspect of the present disclosure may comprise determining a first flag specifying whether to perform weighted prediction on a current block and a weight index BcwIdx of bi-prediction with CU-level weight (BCW) for the current block, determining whether to perform default weighted prediction or explicit weighted prediction on the current block based on the first flag and BcwIdx, and generating a prediction block for the current block by performing the determined method.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for performing weighted prediction.

Also, according to the present disclosure, it is possible to provide an image encoding/decoding method and apparatus for performing weighted prediction or bi-prediction with CU-level weight (BCW) in consideration of PROF.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

MODE FOR INVENTION

Figure 1:
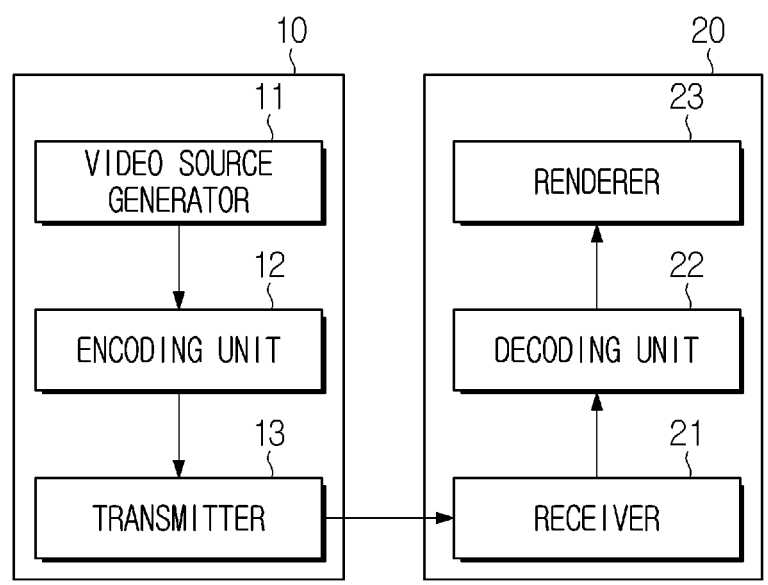
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
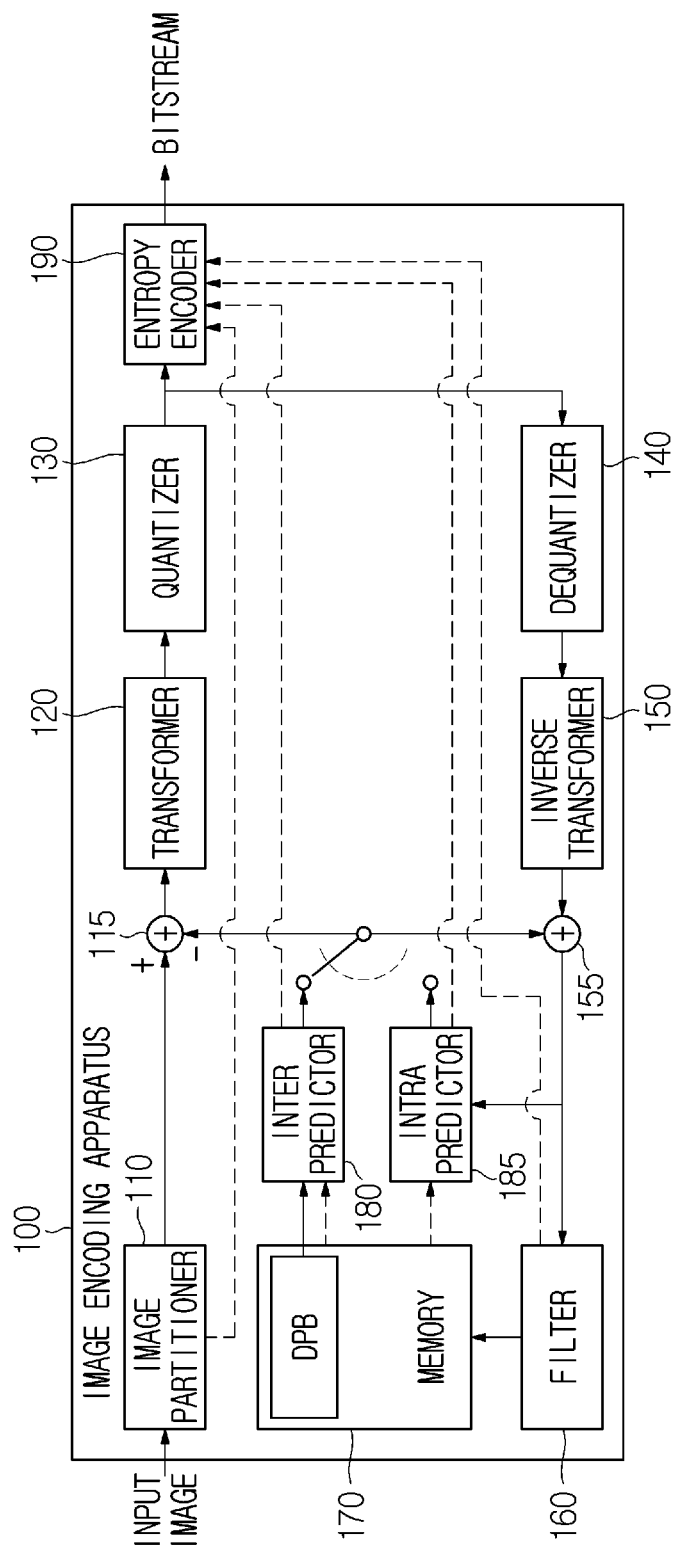
FIG. 2 is a view schematically illustrating an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, as described below, luma mapping with chroma scaling (LMCS) is applicable in a picture encoding process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
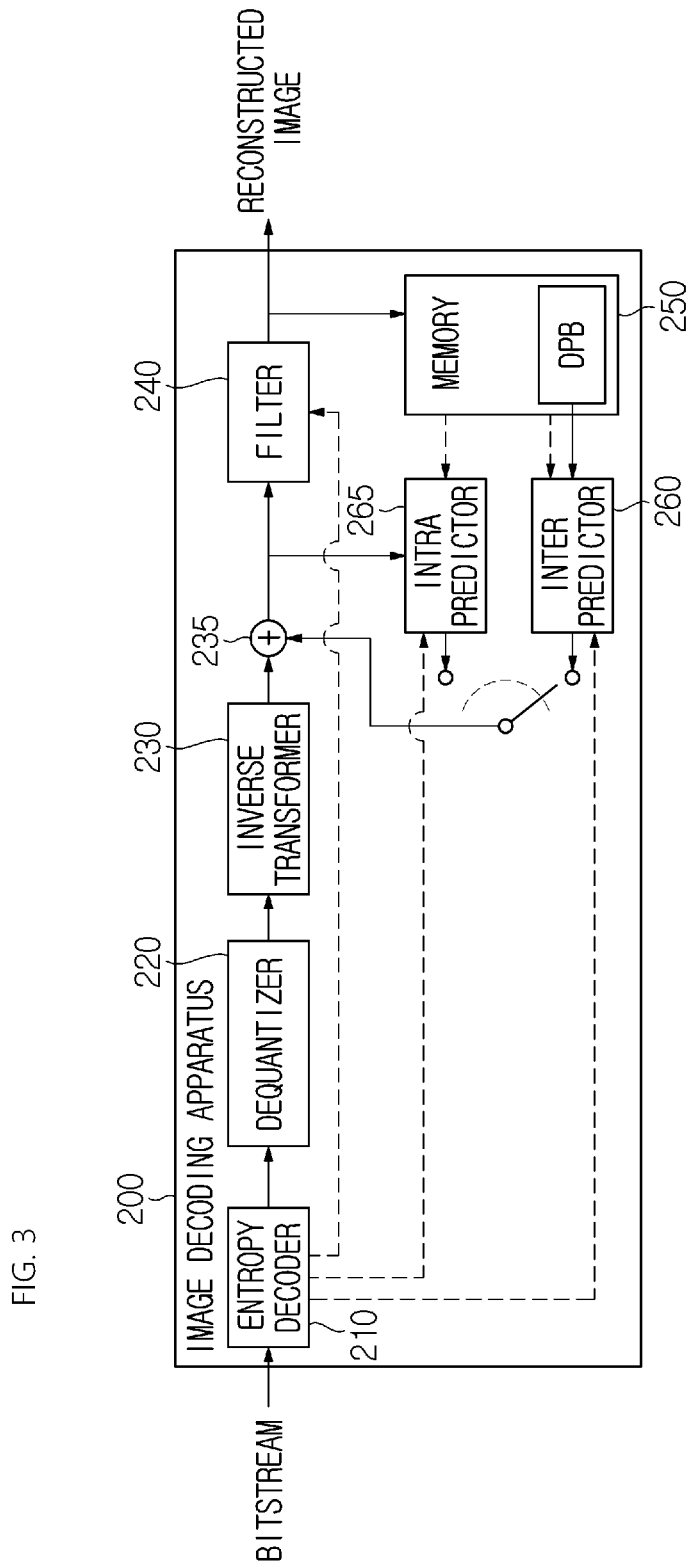
FIG. 3 is a view schematically illustrating an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235.

Meanwhile, as described below, luma mapping with chroma scaling (LMCS) is applicable in a picture decoding process.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Inter Prediction

An image encoding apparatus/image decoding apparatus may perform inter prediction in units of blocks to derive a prediction sample. Inter prediction may mean prediction derived in a manner that is dependent on data elements of picture(s) other than a current picture. When inter prediction applies to the current block, a predicted block for the current block may be derived based on a reference block specified by a motion vector on a reference picture.

In this case, in order to reduce the amount of motion information transmitted in an inter prediction mode, motion information of the current block may be derived based on correlation of motion information between a neighboring block and the current block, and motion information may be derived in units of blocks, subblocks or samples. The motion information may include a motion vector and a reference picture index. The motion information may further include inter prediction type information. Here, the inter prediction type information may mean directional information of inter prediction. The inter prediction type information may indicate that a current block is predicted using one of L0 prediction, L1 prediction or Bi-prediction.

When applying inter prediction to the current block, the neighboring block of the current block may include a spatial neighboring block present in the current picture and a temporal neighboring block present in the reference picture. A reference picture including the reference block for the current block and a reference picture including the temporal neighboring block may be the same or different. The temporal neighboring block may be referred to as a collocated reference block or collocated CU (colCU), and the reference picture including the temporal neighboring block may be referred to as a collocated picture (colPic).

Meanwhile, a motion information candidate list may be constructed based on the neighboring blocks of the current block, and, in this case, flag or index information indicating which candidate is used may be signaled in order to derive the motion vector of the current block and/or the reference picture index.

The motion information may include L0 motion information and/or L1 motion information according to the inter prediction type. The motion vector in an L0 direction may be defined as an L0 motion vector or MVL0, and the motion vector in an L1 direction may be defined as an L1 motion vector or MVL1. Prediction based on the L0 motion vector may be defined as L0 prediction, prediction based on the L1 motion vector may be defined as L1 prediction, and prediction based both the L0 motion vector and the L1 motion vector may be defined as Bi-prediction. Here, the L0 motion vector may mean a motion vector associated with a reference picture list L0 and the L1 motion vector may mean a motion vector associated with a reference picture list L1.

The reference picture list L0 may include pictures before the current picture in output order as reference pictures, and the reference picture list L1 may include pictures after the current picture in output order. The previous pictures may be defined as forward (reference) pictures and the subsequent pictures may be defined as backward (reference) pictures. Meanwhile, the reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 4:
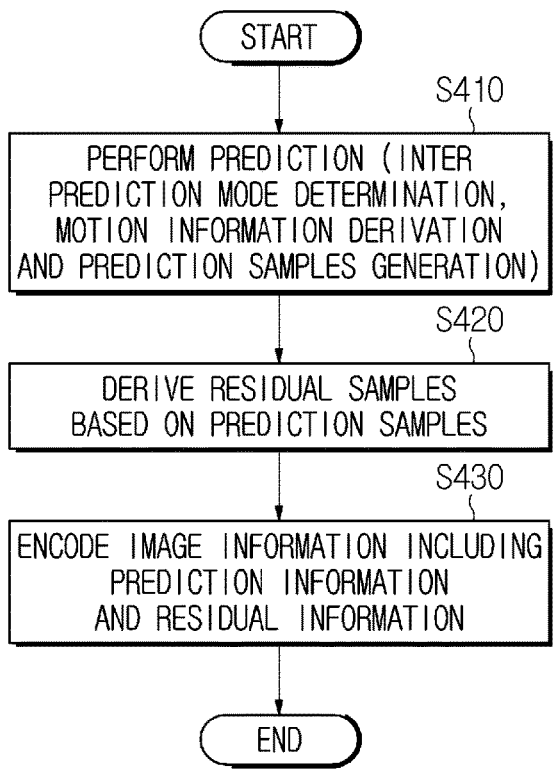
FIG. 4 is a flowchart illustrating an inter prediction based video/image encoding method.

FIG. 4 is a flowchart illustrating an inter prediction based video/image encoding method.

Figure 5:
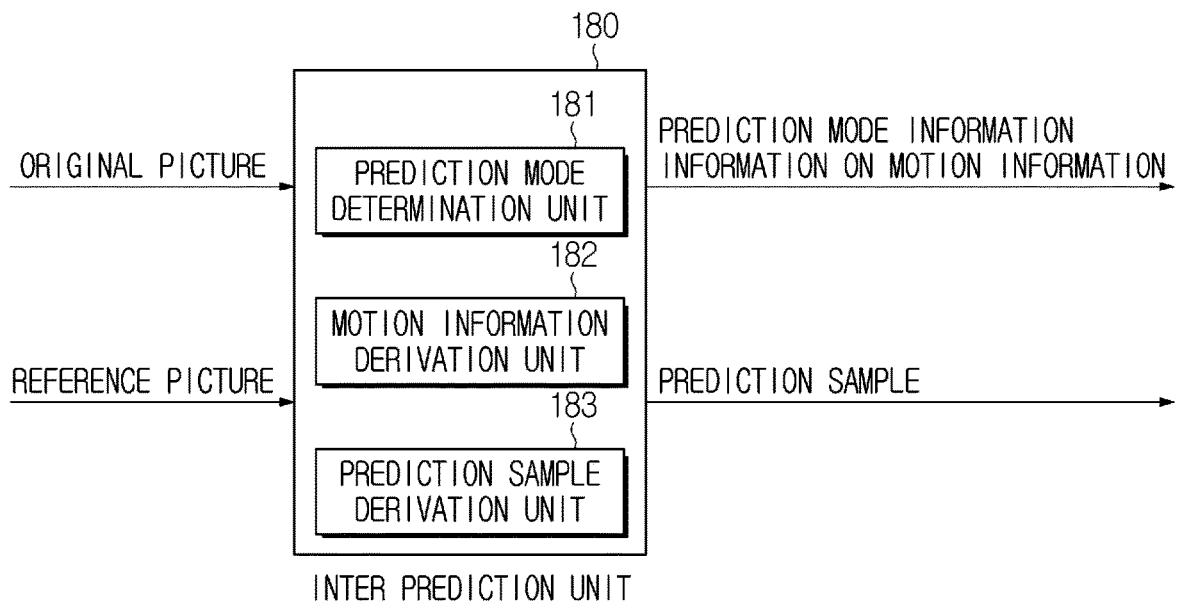
FIG. 5 is a view illustrating the configuration of an inter prediction unit 180 according to the present disclosure.

FIG. 5 is a view illustrating the configuration of an inter predictor 180 according to the present disclosure.

Figure 6:
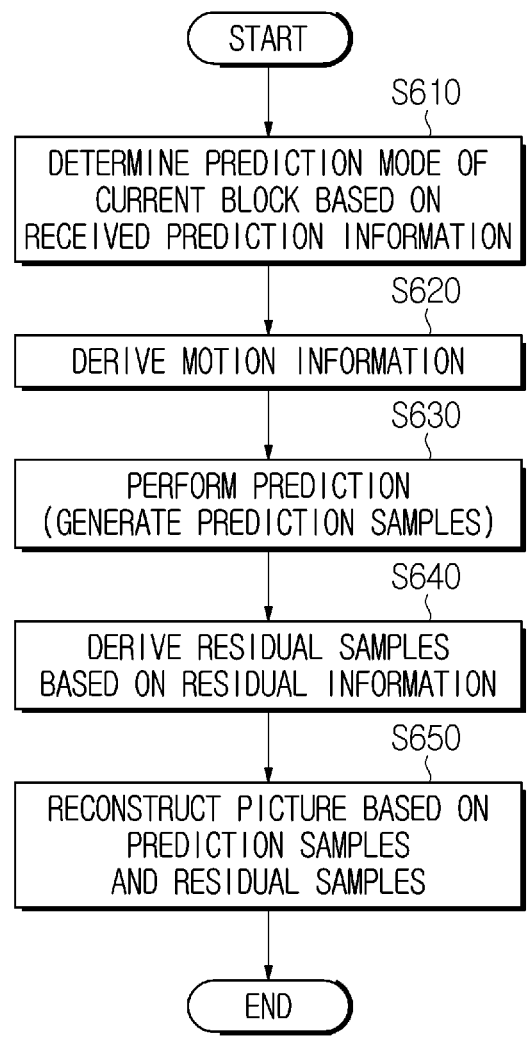
FIG. 6 is a flowchart illustrating an inter prediction based video/image decoding method.

The encoding method of FIG. 6 may be performed by the image encoding apparatus of FIG. 2. Specifically, step S410 may be performed by the inter predictor 180, and step S420 may be performed by the residual processor. Specifically, step S420 may be performed by the subtractor 115. Step S430 may be performed by the entropy encoder 190. The prediction information of step S630 may be derived by the inter predictor 180, and the residual information of step S630 may be derived by the residual processor. The residual information is information on the residual samples. The residual information may include information on quantized transform coefficients for the residual samples. As described above, the residual samples may be derived as transform coefficients through the transformer 120 of the image encoding apparatus, and the transform coefficient may be derived as quantized transform coefficients through the quantizer 130. Information on the quantized transform coefficients may be encoded by the entropy encoder 190 through a residual coding procedure.

The image encoding apparatus may perform inter prediction with respect to a current block (S410). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, as shown in FIG. 5, the inter prediction unit 180 of the image encoding apparatus may include a prediction mode determination unit 181, a motion information derivation unit 182 and a prediction sample derivation unit 183. The prediction mode determination unit 181 may determine the prediction mode of the current block, the motion information derivation unit 182 may derive the motion information of the current block, and the prediction sample derivation unit 183 may derive the prediction samples of the current block. For example, the inter prediction unit 180 of the image encoding apparatus may search for a block similar to the current block within a predetermined area (search area) of reference pictures through motion estimation, and derive a reference block whose difference from the current block is equal to or less than a predetermined criterion or a minimum. Based on this, a reference picture index indicating a reference picture in which the reference block is located may be derived, and a motion vector may be derived based on a position difference between the reference block and the current block. The image encoding apparatus may determine a mode applying to the current block among various inter prediction modes. The image encoding apparatus may compare rate-distortion (RD) costs for the various prediction modes and determine an optimal inter prediction mode of the current block. However, the method of determining the inter prediction mode of the current block by the image encoding apparatus is not limited to the above example, and various methods may be used.

For example, the inter prediction mode of the current block may be determined to be at least one of a merge mode, a merge skip mode, a motion vector prediction (MVP) mode, a symmetric motion vector difference (SMVD) mode, an affine mode, a subblock-based merge mode, an adaptive motion vector resolution (AMVR) mode, a history-based motion vector predictor (HMVP) mode, a pair-wise average merge mode, a merge mode with motion vector differences (MMVD) mode, a decoder side motion vector refinement (DMVR) mode, a combined inter and intra prediction (CIIP) mode or a geometric partitioning mode (GPM).

For example, when a skip mode or a merge mode applies to the current block, the image encoding apparatus may derive merge candidates from neighboring blocks of the current block and construct a merge candidate list using the derived merge candidates. In addition, the image encoding apparatus may derive a reference block whose difference from the current block is equal to or less than a predetermined criterion or a minimum, among reference blocks indicated by merge candidates included in the merge candidate list. In this case, a merge candidate associated with the derived reference block may be selected, and merge index information indicating the selected merge candidate may be generated and signaled to an image decoding apparatus. The motion information of the current block may be derived using the motion information of the selected merge candidate.

As another example, when an MVP mode applies to the current block, the image encoding apparatus may derive motion vector predictor (MVP) candidates from the neighboring blocks of the current block and construct an MVP candidate list using the derived MVP candidates. In addition, the image encoding apparatus may use the motion vector of the MVP candidate selected from among the MVP candidates included in the MVP candidate list as the MVP of the current block. In this case, for example, the motion vector indicating the reference block derived by the above-described motion estimation may be used as the motion vector of the current block, an MVP candidate with a motion vector having a smallest difference from the motion vector of the current block among the MVP candidates may be the selected MVP candidate. A motion vector difference (MVD) which is a difference obtained by subtracting the MVP from the motion vector of the current block may be derived. In this case, index information indicating the selected MVP candidate and information on the MVD may be signaled to the image decoding apparatus. In addition, when applying the MVP mode, the value of the reference picture index may be constructed as reference picture index information and separately signaled to the image decoding apparatus.

The image encoding apparatus may derive residual samples based on the prediction samples (S420). The image encoding apparatus may derive the residual samples through comparison between original samples of the current block and the prediction samples. For example, the residual sample may be derived by subtracting a corresponding prediction sample from an original sample.

The image encoding apparatus may encode image information including prediction information and residual information (S430). The image encoding apparatus may output the encoded image information in the form of a bitstream. The prediction information may include prediction mode information (e.g., skip flag, merge flag or mode index, etc.) and information on motion information as information related to the prediction procedure. Among the prediction mode information, the skip flag indicates whether a skip mode applies to the current block, and the merge flag indicates whether the merge mode applies to the current block. Alternatively, the prediction mode information may indicate one of a plurality of prediction modes, such as a mode index. When the skip flag and the merge flag are 0, it may be determined that the MVP mode applies to the current block. The information on the motion information may include candidate selection information (e.g., merge index, mvp flag or mvp index) which is information for deriving a motion vector. Among the candidate selection information, the merge index may be signaled when the merge mode applies to the current block and may be information for selecting one of merge candidates included in a merge candidate list. Among the candidate selection information, the MVP flag or the MVP index may be signaled when the MVP mode applies to the current block and may be information for selecting one of MVP candidates in an MVP candidate list. Specifically, the MVP flag may be signaled using a syntax element mvp_10_flag or mvp_11_flag. In addition, the information on the motion information may include information on the above-described MVD and/or reference picture index information. In addition, the information on the motion information may include information indicating whether to apply L0 prediction, L1 prediction or Bi-prediction. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

FIG. 6 is a flowchart illustrating an inter prediction based video/image decoding method.

Figure 7:
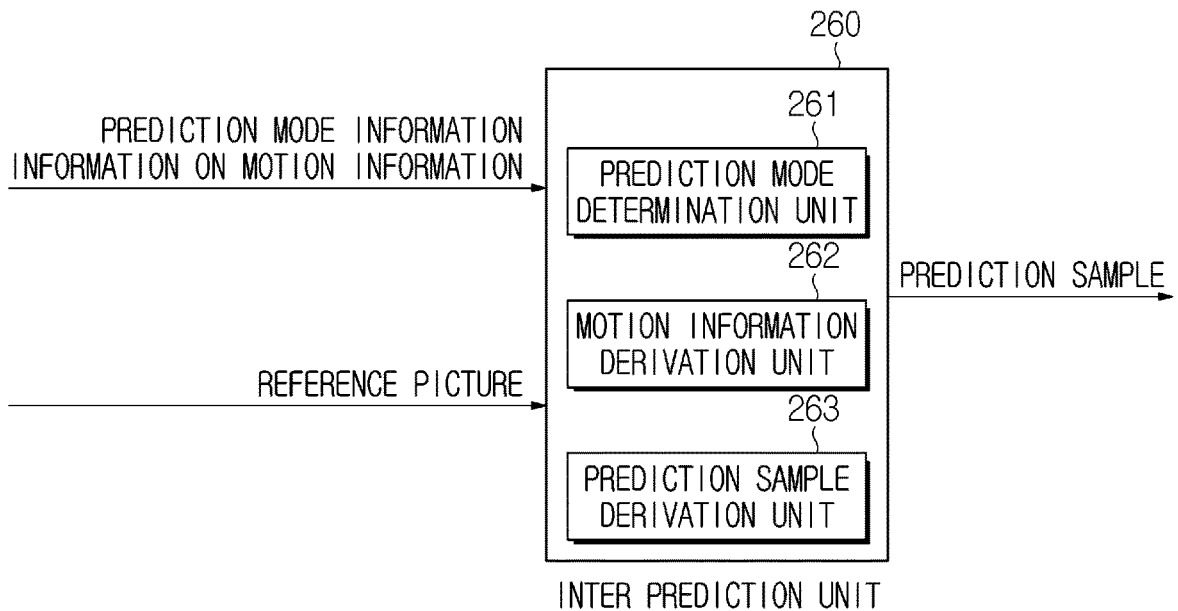
FIG. 7 is a view illustrating the configuration of an inter prediction unit 260 according to the present disclosure.

FIG. 7 is a view illustrating the configuration of an inter prediction unit 260 according to the present disclosure.

The image decoding apparatus may perform operation corresponding to operation performed by the image encoding apparatus. The image decoding apparatus may perform prediction with respect to a current block based on received prediction information and derive prediction samples.

The decoding method of FIG. 6 may be performed by the image decoding apparatus of FIG. 3. Steps S610 to S630 may be performed by the inter prediction unit 260, and the prediction information of step S610 and the residual information of step S640 may be obtained from a bitstream by the entropy decoder 210. The residual processor of the image decoding apparatus may derive residual samples for a current block based on the residual information (S640). Specifically, the dequantizer 220 of the residual processor may perform dequantization based on quantized transform coefficients derived based on the residual information to derive transform coefficients, and the inverse transformer 230 of the residual processor may perform inverse transform with respect to the transform coefficients to derive the residual samples for the current block. Step S650 may be performed by the adder 235 or the reconstructor.

Specifically, the image decoding apparatus may determine the prediction mode of the current block based on the received prediction information (S610). The image decoding apparatus may determine which inter prediction mode applies to the current block based on the prediction mode information in the prediction information.

For example, it may be determined whether the skip mode applies to the current block based on the skip flag. In addition, it may be determined whether the merge mode or the MVP mode applies to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

The image decoding apparatus may derive the motion information of the current block based on the determined inter prediction mode (S620). For example, when the skip mode or the merge mode applies to the current block, the image decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. For example, the motion information of the selected merge candidate may be used as the motion information of the current block.

As another example, when the MVP mode applies to the current block, the image decoding apparatus may construct an MVP candidate list and use the motion vector of an MVP candidate selected from among MVP candidates included in the MVP candidate list as an MVP of the current block. The selection may be performed based on the above-described candidate selection information (mvp flag or mvp index). In this case, the MVD of the current block may be derived based on information on the MVD, and the motion vector of the current block may be derived based on MVP and MVD of the current block. In addition, the reference picture index of the current block may be derived based on the reference picture index information. A picture indicated by the reference picture index in the reference picture list of the current block may be derived as a reference picture referenced for inter prediction of the current block.

The image decoding apparatus may generate prediction samples of the current block based on motion information of the current block (S630). In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed with respect to all or some of the prediction samples of the current block.

For example, as shown in FIG. 7, the inter prediction unit 260 of the image decoding apparatus may include a prediction mode determination unit 261, a motion information derivation unit 262 and a prediction sample derivation unit 263. In the inter prediction unit 260 of the image decoding apparatus, the prediction mode determination unit 261 may determine the prediction mode of the current block based on the received prediction mode information, the motion information derivation unit 262 may derive the motion information (a motion vector and/or a reference picture index, etc.) of the current block based on the received motion information, and the prediction sample derivation unit 263 may derive the prediction samples of the current block.

The image decoding apparatus may generate residual samples of the current block based the received residual information (S640). The image decoding apparatus may generate the reconstructed samples of the current block based on the prediction samples and the residual samples and generate a reconstructed picture based on this (S650).

Thereafter, an in-loop filtering procedure is applicable to the reconstructed picture as described above.

As described above, the inter prediction procedure may include step of determining an inter prediction mode, step of deriving motion information according to the determined prediction mode, and step of performing prediction (generating prediction samples) based on the derived motion information. The inter prediction procedure may be performed by the image encoding apparatus and the image decoding apparatus, as described above.

Hereinafter, the step of deriving the motion information according to the prediction mode will be described in greater detail.

As described above, inter prediction may be performed using motion information of a current block. An image encoding apparatus may derive optimal motion information of a current block through a motion estimation procedure. For example, the image encoding apparatus may search for a similar reference block with high correlation within a predetermined search range in the reference picture using an original block in an original picture for the current block in fractional pixel unit, and derive motion information using the same. Similarity of the block may be calculated based on a sum of absolute differences (SAD) between the current block and the reference block. In this case, motion information may be derived based on a reference block with a smallest SAD in the search area. The derived motion information may be signaled to an image decoding apparatus according to various methods based on an inter prediction mode.

When a merge mode applies to a current block, motion information of the current block is not directly transmitted and motion information of the current block is derived using motion information of a neighboring block. Accordingly, motion information of a current prediction block may be indicated by transmitting flag information indicating that the merge mode is used and candidate selection information (e.g., a merge index) indicating which neighboring block is used as a merge candidate. In the present disclosure, since the current block is a unit of prediction performance, the current block may be used as the same meaning as the current prediction block, and the neighboring block may be used as the same meaning as a neighboring prediction block.

The image encoding apparatus may search for merge candidate blocks used to derive the motion information of the current block to perform the merge mode. For example, up to five merge candidate blocks may be used, without being limited thereto. The maximum number of merge candidate blocks may be transmitted in a slice header or a tile group header, without being limited thereto. After finding the merge candidate blocks, the image encoding apparatus may generate a merge candidate list and select a merge candidate block with smallest RD cost as a final merge candidate block.

The present disclosure provides various embodiments for the merge candidate blocks configuring the merge candidate list. The merge candidate list may use, for example, five merge candidate blocks. For example, four spatial merge candidates and one temporal merge candidate may be used.

Figure 8:
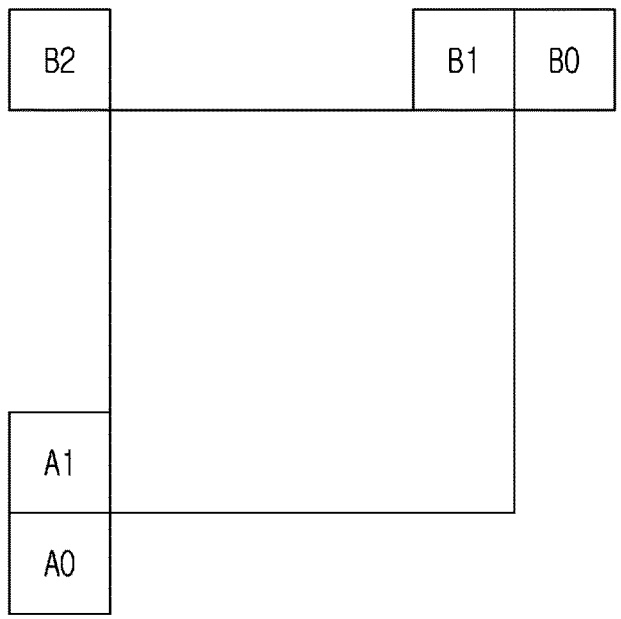
FIG. 8 is a view illustrating neighboring blocks available as a spatial merge candidate.

FIG. 8 is a view illustrating neighboring blocks available as a spatial merge candidate.

Figure 9:
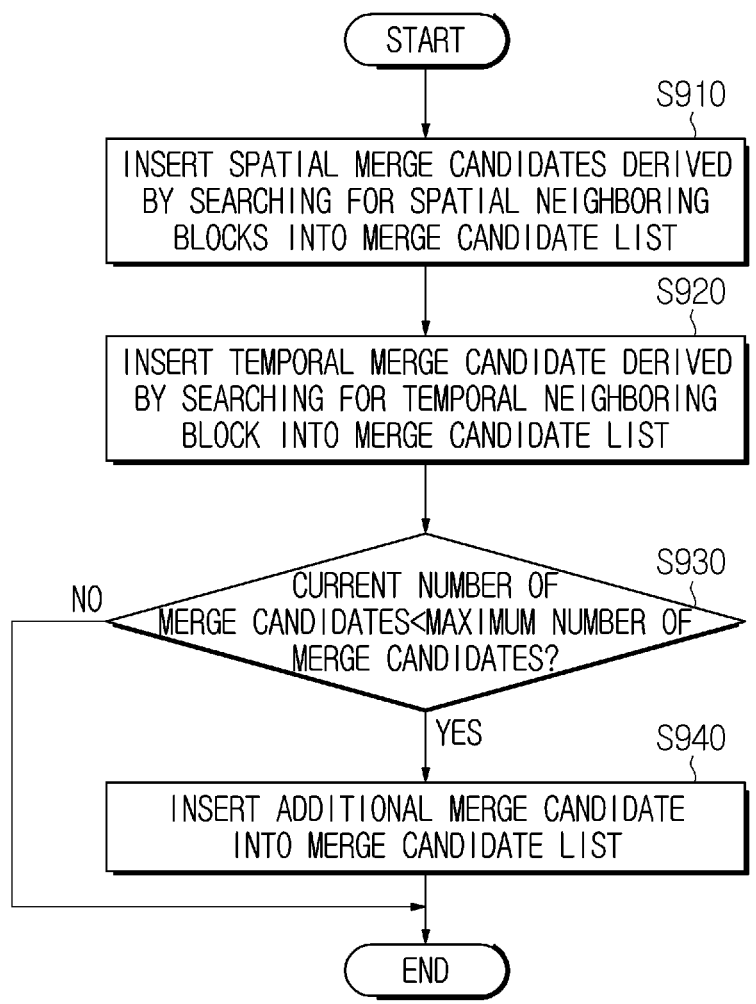
FIG. 9 is a view schematically illustrating a merge candidate list construction method according to an example of the present disclosure.

FIG. 9 is a view schematically illustrating a merge candidate list construction method according to an example of the present disclosure.

An image encoding/decoding apparatus may insert, into a merge candidate list, spatial merge candidates derived by searching for spatial neighboring blocks of a current block (S910). For example, as shown in FIG. 8, the spatial neighboring blocks may include a bottom-left corner neighboring block $A_0$, a left neighboring block $A_1$, a top-right corner neighboring block $B_0$, a top neighboring block $B_1$, and a top-left corner neighboring block $B_2$ of the current block. However, this is an example and, in addition to the above-described spatial neighboring blocks, additional neighboring blocks such as a right neighboring block, a bottom neighboring block and a bottom-right neighboring block may be further used as the spatial neighboring blocks. The image encoding/decoding apparatus may detect available blocks by searching for the spatial neighboring blocks based on priority and derive motion information of the detected blocks as the spatial merge candidates. For example, the image encoding/decoding apparatus may construct a merge candidate list by searching for the five blocks shown in FIG. 8 in order of $A_1$, $B_1$, $B_0$, $A_0$ and $B_2$ and sequentially indexing available candidates.

The image encoding/decoding apparatus may insert, into the merge candidate list, a temporal merge candidate derived by searching for temporal neighboring blocks of the current block (S920). The temporal neighboring blocks may be located on a reference picture which is different from a current picture in which the current block is located. A reference picture in which the temporal neighboring block is located may be referred to as a collocated picture or a col picture. The temporal neighboring block may be searched for in order of a bottom-right corner neighboring block and a bottom-right center block of the co-located block for the current block on the col picture. Meanwhile, when applying motion data compression in order to reduce memory load, specific motion information may be stored as representative motion information for each predetermined storage unit for the col picture. In this case, motion information of all blocks in the predetermined storage unit does not need to be stored, thereby obtaining motion data compression effect. In this case, the predetermined storage unit may be predetermined as, for example, 16×16 sample unit or 8×8 sample unit or size information of the predetermined storage unit may be signaled from the image encoding apparatus to the image decoding apparatus. When applying the motion data compression, the motion information of the temporal neighboring block may be replaced with the representative motion information of the predetermined storage unit in which the temporal neighboring block is located. That is, in this case, from the viewpoint of implementation, the temporal merge candidate may be derived based on the motion information of a prediction block covering an arithmetic left-shifted position after an arithmetic right shift by a predetermined value based on coordinates (top-left sample position) of the temporal neighboring block, not a prediction block located on the coordinates of the temporal neighboring block. For example, when the predetermined storage unit is a 2"×2" sample unit and the coordinates of the temporal neighboring block are (xTnb, yTnb), the motion information of a prediction block located at a modified position ((xTnb»n)«n), (yTnb»n)«n)) may be used for the temporal merge candidate. Specifically, for example, when the predetermined storage unit is a 16×16 sample unit and the coordinates of the temporal neighboring block are (xTnb, yTnb), the motion information of a prediction block located at a modified position ((xTnb»4)«4), (yTnb»4)«4)) may be used for the temporal merge candidate. Alternatively, for example, when the predetermined storage unit is an 8×8 sample unit and the coordinates of the temporal neighboring block are (xTnb, yTnb), the motion information of a prediction block located at a modified position ((xTnb»3)«3), (yTnb»3)«3)) may be used for the temporal merge candidate.

Referring to FIG. 9 again, the image encoding/decoding apparatus may check whether the current number of merge candidates is less than a maximum number of merge candidates (S930). The maximum number of merge candidates may be predefined or signaled from the image encoding apparatus to the image decoding apparatus. For example, the image encoding apparatus may generate and encode information on the maximum number of merge candidates and transmit the encoded information to the image decoding apparatus in the form of a bitstream. When the maximum number of merge candidates is satisfied, a subsequent candidate addition process S940 may not be performed.

When the current number of merge candidates is less than the maximum number of merge candidates as a checked result of step S930, the image encoding/decoding apparatus may derive an additional merge candidate according to a predetermined method and then insert the additional merge candidate to the merge candidate list (S940). The additional merge candidate may include, for example, at least one of history based merge candidate(s), pair-wise average merge candidate(s), ATMVP, combined bi-predictive merge candidate(s) (when a slice/tile group type of a current slice/tile group is a B type) and/or zero vector merge candidate(s).

When the current number of merge candidates is not less than the maximum number of merge candidates as a checked result of step S930, the image encoding/decoding apparatus may end the construction of the merge candidate list. In this case, the image encoding apparatus may select an optimal merge candidate from among the merge candidates configuring the merge candidate list, and signal candidate selection information (e.g., merge candidate index or merge index) indicating the selected merge candidate to the image decoding apparatus. The image decoding apparatus may select the optimal merge candidate based on the merge candidate list and the candidate selection information.

The motion information of the selected merge candidate may be used as the motion information of the current block, and the prediction samples of the current block may be derived based on the motion information of the current block, as described above. The image encoding apparatus may derive the residual samples of the current block based on the prediction samples and signal residual information of the residual samples to the image decoding apparatus. The image decoding apparatus may generate reconstructed samples based on the residual samples derived based on the residual information and the prediction samples and generate the reconstructed picture based on the same, as described above.

When applying a skip mode to the current block, the motion information of the current block may be derived using the same method as the case of applying the merge mode. However, when applying the skip mode, a residual signal for a corresponding block is omitted and thus the prediction samples may be directly used as the reconstructed samples. The above skip mode may apply, for example, when the value of cu_skip_flag is 1.

Hereinafter, a method of deriving a spatial candidate in a merge mode and/or a skip mode will be described. The spatial candidate may represent the above-described spatial merge candidate.

Derivation of the spatial candidate may be performed based on spatially neighboring blocks. For example, a maximum of four spatial candidates may be derived from candidate blocks existing at positions shown in FIG. 8. The order of deriving spatial candidates may be A1→B1→B0→A0→B2. However, the order of deriving spatial candidates is not limited to the above order and may be, for example, B1→A1→B0→A0→B2. The last position in the order (position B2 in the above example) may be considered when at least one of the preceding four positions (A1, B1, B0 and A0 in the above example) is not available. In this case, a block at a predetermined position being not available may include a corresponding block belonging to a slice or tile different from the current block or a corresponding block being an intra-predicted block. When a spatial candidate is derived from a first position in the order (A1 or B1 in the above example), redundancy check may be performed on spatial candidates of subsequent positions. For example, when motion information of a subsequent spatial candidate is the same as motion information of a spatial candidate already included in a merge candidate list, the subsequent spatial candidate may not be included in the merge candidate list, thereby improving encoding efficiency. Redundancy check performed on the subsequent spatial candidate may be performed on some candidate pairs instead of all possible candidate pairs, thereby reducing computational complexity.

Figure 10:
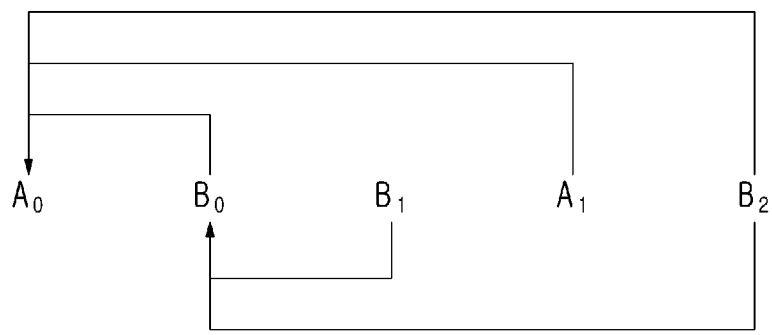
FIG. 10 is a view illustrating a candidate pair for redundancy check performed on a spatial candidate.

FIG. 10 is a view illustrating a candidate pair for redundancy check performed on a spatial candidate.

In the example shown in FIG. 10, redundancy check for a spatial candidate at a position $B_0$ may be performed only for a spatial candidate at a position $A_0$. In addition, redundancy check for a spatial candidate at a position $B_1$ may be performed only for a spatial candidate at a position $B_0$. In addition, redundancy check for a spatial candidate at a position $A_1$ may be performed only for a spatial candidate at a position $A_0$. Finally, redundancy check for a spatial candidate at a position $B_2$ may be performed only for spatial candidates at a position $A_0$ and a position $B_0$.

In the example shown in FIG. 10, the order of deriving the spatial candidates is A0→B0→B1→A1→B2. However, the present disclosure is not limited thereto and, even if the order of deriving the spatial candidates is changed, as in the example shown in FIG. 10, redundancy check may be performed only on some candidate pairs.

Hereinafter, a method of deriving a temporal candidate in the case of a merge mode and/or a skip mode will be described. The temporal candidate may represent the above-described temporal merge candidate. In addition, the motion vector of the temporal candidate may correspond to the temporal candidate of an MVP mode.

In the case of the temporal candidate, only one candidate may be included in a merge candidate list. In the process of deriving the temporal candidate, the motion vector of the temporal candidate may be scaled. For example, the scaling may be performed based on a collocated block (CU) (hereinafter referred to as a "col block") belonging to a collocated reference picture (colPic) (hereinafter referred to as "col picture"). A reference picture list used to derive the col block may be explicitly signaled in a slice header.

Figure 11:
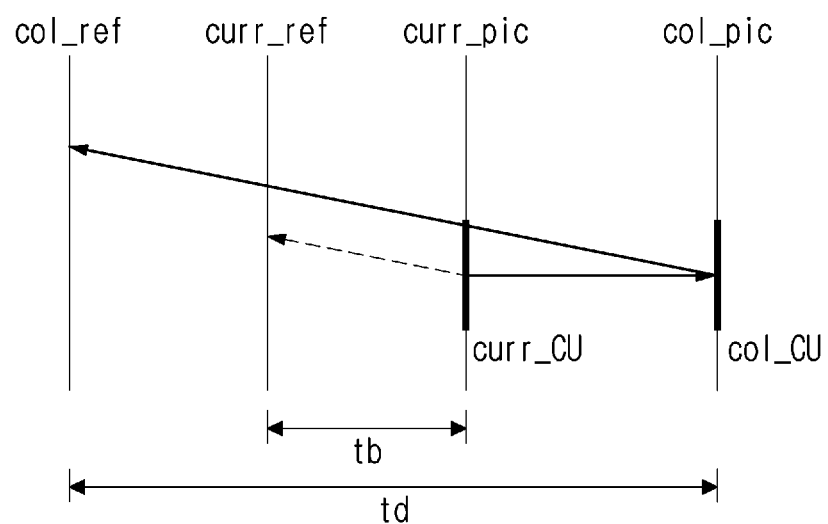
FIG. 11 is a view illustrating a method of scaling a motion vector of a temporal candidate.

FIG. 11 is a view illustrating a method of scaling a motion vector of a temporal candidate.

In FIG. 11, curr_CU and curr_pic respectively denote a current block and a current picture, and col_CU and col_pic respectively denote a col block and a col picture. In addition, curr ref denote a reference picture of a current block, and col_ref denotes a reference picture of a col block. In addition, tb denotes a distance between the reference picture of the current block and the current picture, and td denotes a distance between the reference picture of the col block and the col picture. tb and td may denote values corresponding to differences in POC (Picture Order Count) between pictures. Scaling of the motion vector of the temporal candidate may be performed based on tb and td. In addition, the reference picture index of the temporal candidate may be set to 0.

Figure 12:
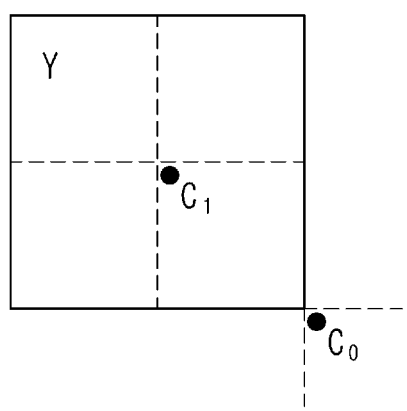
FIG. 12 is a view illustrating a position where a temporal candidate is derived.

FIG. 12 is a view illustrating a position where a temporal candidate is derived.

In FIG. 12, a block with a thick solid line denotes a current block. A temporal candidate may be derived from a block in a col picture corresponding to a position $C_0$ (bottom-right position) or $C_1$ (center position) of FIG. 12. First, it may be determined whether the position $C_0$ is available and, when the position $C_0$ is available, the temporal candidate may be derived based on the position $C_0$. When the position $C_0$ is not available, the temporal candidate may be derived based on the position $C_1$. For example, when a block in the col picture at the position $C_0$ is an intra-predicted block or is located outside a current CTU row, it may be determined that the position $C_0$ is not available.

As described above, when applying motion data compression, the motion vector of the col block may be stored for each predetermined unit block. In this case, in order to derive the motion vector of a block covering the position $C_0$ or the position $C_1$, the position $C_0$ or the position $C_1$ may be modified. For example, when the predetermined unit block is an 8×8 block and the position $C_0$ or the position $C_1$ is (xColCi, yColCi), a position for deriving the temporal candidate may be modified to ((xColCi»3)«3, (yColCi»3)«3).

Hereinafter, a method of deriving a history-based candidate in the case of a merge mode and/or a skip mode will be described. The history-based candidate may be expressed by a history-based merge candidate.

The history-based candidate may be added to a merge candidate list after a spatial candidate and a temporal candidate are added to the merge candidate list. For example, motion information of a previously encoded/decoded block may be stored at a table and used as a history-based candidate of a current block. The table may store a plurality of history-based candidates during the encoding/decoding process. The table may be initialized when a new CTU row starts. Initializing the table may mean that the corresponding table is emptied by deleting all the history-based candidates stored in the table. Whenever there is an inter-predicted block, related motion information may be added to the table as a last entry. In this case, the inter-predicted block may not be a block predicted based on a subblock. The motion information added to the table may be used as a new history-based candidate.

The table of the history-based candidates may have a predetermined size. For example, the size may be 5. In this case, the table may store a maximum of five history-based candidates. When a new candidate is added to the table, a limited first-in-first-out (FIFO) rule in which redundancy check of checking whether the same candidate is present in the table may apply. If the same candidate is already present in the table, the same candidate may be deleted from the table and positions of all subsequent history-based candidates may be moved forward.

The history-based candidate may be used in a process of configuring the merge candidate list. In this case, the history-based candidates recently included in the table may be sequentially checked and located at a position after the temporal candidate of the merge candidate list. When the history-based candidate is included in the merge candidate list, redundancy check with the spatial candidates or temporal candidates already included in the merge candidate list may be performed. If the spatial candidate or temporal candidate already included in the merge candidate list and the history-based candidate overlap, the history-based candidate may not be included in the merge candidate list. By simplifying the redundancy check as follows, the amount of computation may be reduced.

The number of history-based candidates used to generate the merge candidate list may be set to (N<=4)?M: (8−N). In this case, N may denote the number of candidates already included in the merge candidate list, and M may denote the number of available history-based candidate included in the table. That is, when 4 or less candidates are included in the merge candidate list, the number of history-based candidates used to generate the merge candidate list may be M, and, when N candidates greater than 4 are included in the merge candidate list, the number of history-based candidates used to generate the merge candidate list may be set to (8−N).

When the total number of available merge candidates reaches (maximum allowable number of merge candidates−1), configuration of the merge candidate list using the history-based candidate may end.

Hereinafter, a method of deriving a pair-wise average candidate in the case of a merge mode and/or a skip mode will be described. The pair-wise average candidate may be represented by a pair-wise average merge candidate or a pair-wise candidate.

The pair-wise average candidate may be generated by obtaining predefined candidate pairs from the candidates included in the merge candidate list and averaging them. The predefined candidate pairs may be {(0, 1), (0, 2), (1, 2), (0, 3), (1, 3), (2, 3)} and the number configuring each candidate pair may be an index of the merge candidate list. That is, the predefined candidate pair (0, 1) may mean a pair of index 0 candidate and index 1 candidate of the merge candidate list, and the pair-wise average candidate may be generated by an average of index 0 candidate and index 1 candidate. Derivation of pair-wise average candidates may be performed in the order of the predefined candidate pairs. That is, after deriving a pair-wise average candidate for the candidate pair (0, 1), the process of deriving the pair-wise average candidate may be performed in order of the candidate pair (0, 2) and the candidate pair (1, 2). The pair-wise average candidate derivation process may be performed until configuration of the merge candidate list is completed. For example, the pair-wise average candidate derivation process may be performed until the number of merge candidates included in the merge candidate list reaches a maximum merge candidate number.

The pair-wise average candidate may be calculated separately for each reference picture list. When two motion vectors are available for one reference picture list (L0 list or L1 list), an average of the two motion vectors may be computed. In this case, even if the two motion vectors indicate different reference pictures, an average of the two motion vectors may be performed. If only one motion vector is available for one reference picture list, an available motion vector may be used as a motion vector of a pair-wise average candidate. If both the two motion vectors are not available for one reference picture list, it may be determined that the reference picture list is not valid.

When configuration of the merge candidate list is not completed even after the pair-wise average candidate is included in the merge candidate list, a zero vector may be added to the merge candidate list until the maximum merge candidate number is reached.

When applying an MVP mode to the current block, a motion vector predictor (mvp) candidate list may be generated using a motion vector of a reconstructed spatial neighboring block (e.g., the neighboring block shown in FIG. 8) and/or a motion vector corresponding to the temporal neighboring block (or Col block). That is, the motion vector of the reconstructed spatial neighboring blocks and the motion vector corresponding to the temporal neighboring blocks may be used as motion vector predictor candidates of the current block. When applying bi-prediction, an mvp candidate list for L0 motion information derivation and an mvp candidate list for L1 motion information derivation are individually generated and used. Prediction information (or information on prediction) of the current block may include candidate selection information (e.g., an MVP flag or an MVP index) indicating an optimal motion vector predictor candidate selected from among the motion vector predictor candidates included in the mvp candidate list. In this case, a prediction unit may select a motion vector predictor of a current block from among the motion vector predictor candidates included in the mvp candidate list using the candidate selection information. The prediction unit of the image encoding apparatus may obtain and encode a motion vector difference (MVD) between the motion vector of the current block and the motion vector predictor and output the encoded MVD in the form of a bitstream. That is, the MVD may be obtained by subtracting the motion vector predictor from the motion vector of the current block. The prediction unit of the image decoding apparatus may obtain a motion vector difference included in the information on prediction and derive the motion vector of the current block through addition of the motion vector difference and the motion vector predictor. The prediction unit of the image decoding apparatus may obtain or derive a reference picture index indicating a reference picture from the information on prediction.

Figure 13:
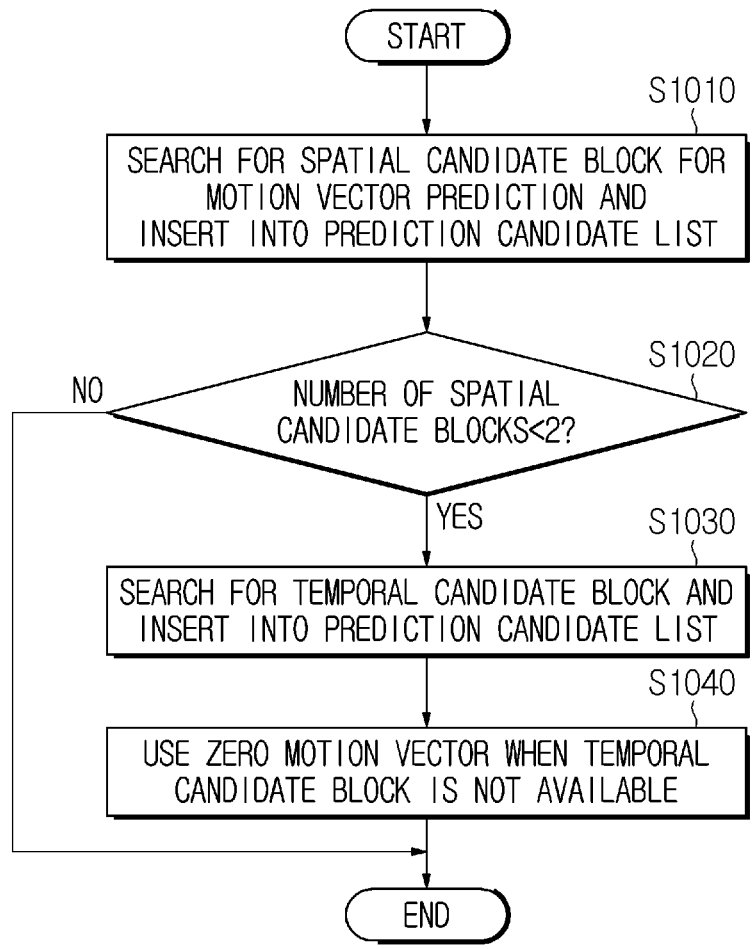
FIG. 13 is a view schematically illustrating a motion vector predictor candidate list configuration method according to an example of the present disclosure.

FIG. 13 is a view schematically illustrating a motion vector predictor candidate list construction method according to an example of the present disclosure.

First, a spatial candidate block of a current block may be searched for and available candidate blocks may be inserted into an MVP candidate list (S1010). Thereafter, it is determined whether the number of MVP candidates included in the MVP candidate list is less than 2 (S1020) and, when the number of MVP candidates is two, construction of the MVP candidate list may be completed.

In step S1020, when the number of available spatial candidate blocks is less than 2, a temporal candidate block of the current block may be searched for and available candidate blocks may be inserted into the MVP candidate list (S1030). When the temporal candidate blocks are not available, a zero motion vector may be inserted into the MVP candidate list (S1040), thereby completing construction of the MVP candidate list.

Meanwhile, when applying an mvp mode, a reference picture index may be explicitly signaled. In this case, a reference picture index refidxL0 for L0 prediction and a reference picture index refidxL1 for L1 prediction may be distinguishably signaled. For example, when applying the MVP mode and applying Bi-prediction, both information on refidxL0 and information on refidxL1 may be signaled.

As described above, when applying the MVP mode, information on MVP derived by the image encoding apparatus may be signaled to the image decoding apparatus. Information on the MVD may include, for example, an MVD absolute value and information indicating x and y components for a sign. In this case, when the MVD absolute value is greater than 0, whether the MVD absolute value is greater than 1 and information indicating an MVD remainder may be signaled stepwise. For example, information indicating whether the MVD absolute value is greater than 1 may be signaled only when a value of flag information indicating whether the MVD absolute value is greater than 0 is 1.

Overview of Affine Mode

Hereinafter, an affine mode which is an example of an inter prediction mode will be described in detail. In a conventional video encoding/decoding system, only one motion vector is used to express motion information of a current block. However, in this method, there is a problem in that optimal motion information is only expressed in units of blocks, but optimal motion information cannot be expressed in units of pixels. In order to solve this problem, an affine mode defining motion information of a block in units of pixels has been proposed. According to the affine mode, a motion vector for each pixel and/or subblock unit of a block may be determined using two to four motion vectors associated with a current block.

Compared to the existing motion information expressed using translation motion (or displacement) of a pixel value, in the affine mode, motion information for each pixel may be expressed using at least one of translation motion, scaling, rotation or shear. Among them, an affine mode in which motion information for each pixel is expressed using displacement, scaling or rotation may be similarity or simplified affine mode. The affine mode in the following description may mean a similarity or simplified affine mode.

Motion information in the affine mode may be expressed using two or more control point motion vectors (CPMVs). A motion vector of a specific pixel position of a current block may be derived using a CPMV. In this case, a set of motion vectors for each pixel and/or subblock of a current block may be defined as an affine motion vector field (affine MVF).

Figure 14:
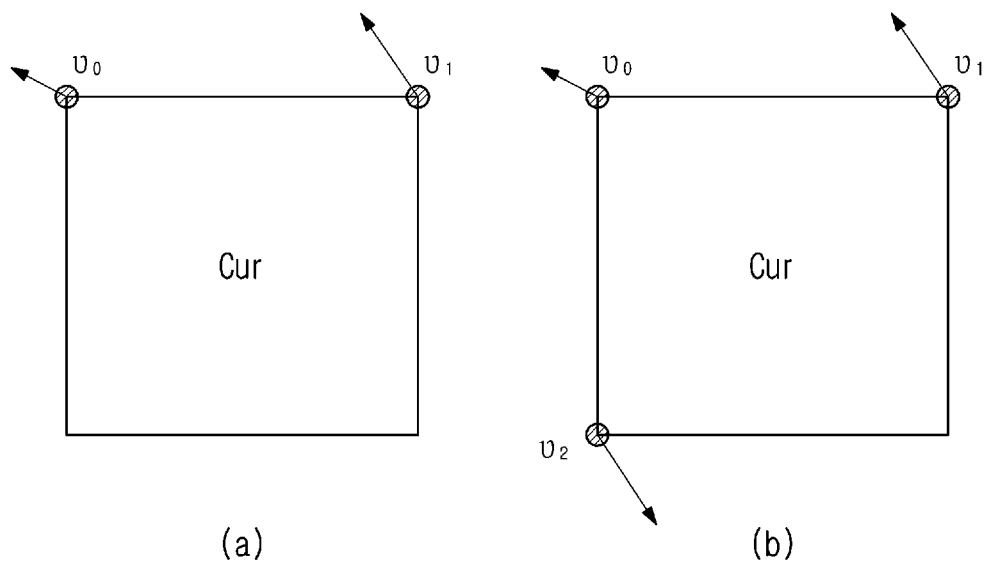
FIG. 14 is a view illustrating a parameter model of an affine mode.

FIG. 14 is a view illustrating a parameter model of an affine mode.

When an affine mode applies to a current block, an affine MVF may be derived using one of a 4-parameter model and a 6-parameter model. In this case, the 4-parameter model may mean a model type in which two CPMVs are used and the 6-parameter model may mean a model type in which three CPMVs are used. FIGS. 14(a) and 14(b) show CPMVs used in the 4-parameter model and the 6-parameter model, respectively.

When the position of the current block is (x, y), a motion vector according to the pixel position may be derived according to Equation 1 or 2 below. For example, the motion vector according to the 4-parameter model may be derived according to Equation 1 and the motion vector according to the 6-parameter model may be derived according to Equation 2.

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad \text{[Equation 1]}$$

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{[Equation 2]}$$

In Equations 1 and 2, mv0={mv_0x, my_0y} may be a CPMV at the top left corner position of the current block, v1={mv_1x, my_1y} may be a CPMV at the top right position of the current block, and mv2={mv_2x, mv_2y} may be a CPMV at the bottom left position of the current block. In this case, W and H respectively correspond to the width and height of the current block, and my={mv_x, mv_y} may mean a motion vector of a pixel position {x, y}.

In an encoding/decoding process, an affine MVF may be determined in units of pixels and/or predefined subblocks. When the affine MVF is determined in units of pixels, a motion vector may be derived based on each pixel value. Meanwhile, when the affine MVF is determined in units of subblocks, a motion vector of a corresponding block may be derived based on a center pixel value of a subblock. The center pixel value may mean a virtual pixel present in the center of a subblock or a bottom right pixel among four pixels present in the center. In addition, the center pixel value may be a specific pixel in a subblock and may be a pixel representing the subblock. In the present disclosure, the case where the affine MVF is determined in units of 4×4 subblocks will be described. However, this is only for convenience of description and the size of the subblock may be variously changed.

That is, when affine prediction is available, a motion model applicable to a current block may include three models, that is, a translational motion model, a 4-parameter affine motion model and 6-parameter affine motion model. Here, the translational motion model may represent a model used by an existing block unit motion vector, the 4-parameter affine motion model may represent a model used by two CPMVs, and the 6-parameter affine motion model may represent a model used by three CPMVs. The affine mode may be divided into detailed modes according to a method of encoding/decoding motion information. For example, the affine mode may be subdivided into an affine MVP mode and an affine merge mode.

When an affine merge mode applies for a current block, a CPMV may be derived from neighboring blocks of the current block encoded/decoded in the affine mode. When at least one of the neighboring blocks of the current block is encoded/decoded in the affine mode, the affine merge mode may apply for the current block. That is, when the affine merge mode applies for the current block, CPMVs of the current block may be derived using CPMVs of the neighboring blocks. For example, the CPMVs of the neighboring blocks may be determined to be the CPMVs of the current block or the CPMV of the current block may be derived based on the CPMVs of the neighboring blocks. When the CPMV of the current block is derived based on the CPMVs of the neighboring blocks, at least one of coding parameters of the current block or the neighboring blocks may be used. For example, CPMVs of the neighboring blocks may be modified based on the size of the neighboring blocks and the size of the current block and used as the CPMVs of the current block.

Meanwhile, affine merge in which an MV is derived in units of subblocks may be referred to as a subblock merge mode, which may be specified by merge_subblock_flag having a first value (e.g., 1). In this case, an affine merging candidate list described below may be referred to as a subblock merging candidate list. In this case, a candidate derived as SbTMVP described below may be further included in the subblock merging candidate list. In this case, the candidate derived as sbTMVP may be used as a candidate of index #0 of the subblock merging candidate list. In other words, the candidate derived as sbTMVP may be located in front of an inherited affine candidates and constructed affine candidates described below in the subblock merging candidate list.

For example, an affine mode flag specifying whether an affine mode is applicable to a current block may be defined, which may be signaled at least one of higher levels of the current block, such as a sequence, a picture, a slice, a tile, a tile group, a brick, etc. For example, the affine mode flag may be named sps_affine_enabled_flag.

When the affine merge mode applies, an affine merge candidate list may be configured to derive the CPMV of the current block. In this case, the affine merge candidate list may include at least one of an inherited affine merge candidate, a constructed affine merge candidate or a zero merge candidate. The inherited affine merge candidate may mean a candidate derived using the CPMVs of the neighboring blocks when the neighboring blocks of the current block are encoded/decoded in the affine mode. The constructed affine merge candidate may mean a candidate having each CPMV derived based on motion vectors of neighboring blocks of each control point (CP). Meanwhile, the zero merge candidate may mean a candidate composed of CPMVs having a size of 0. In the following description, the CP may mean a specific position of a block used to derive a CPMV. For example, the CP may be each vertex position of a block.

Figure 15:
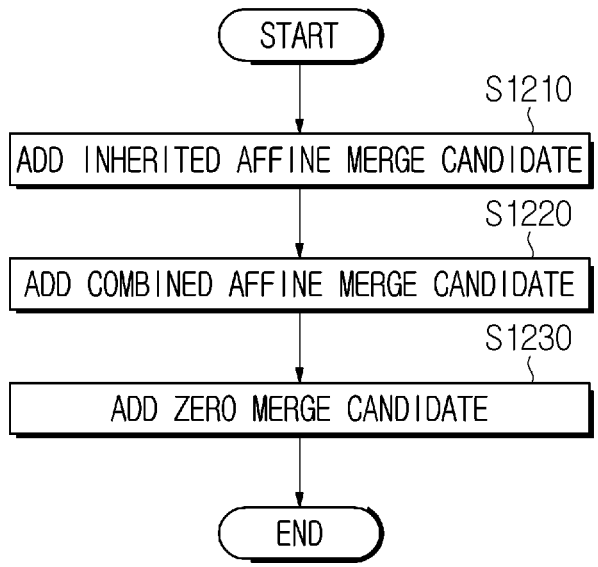
FIG. 15 is a view illustrating a method of generating an affine merge candidate list.

FIG. 15 is a view illustrating a method of generating an affine merge candidate list.

Referring to the flowchart of FIG. 15, affine merge candidates may be added to the affine merge candidate list in order of an inherited affine merge candidate (S1210), a constructed affine merge candidate (S1220) and a zero merge candidate (S1230). The zero merge candidate may be added when the number of candidates included in the candidate list does not satisfy a maximum number of candidates even though all the inherited affine merge candidates and the constructed affine merge candidates are added to the affine merge candidate list. In this case, the zero merge candidate may be added until the number of candidates of the affine merge candidate list satisfies the maximum number of candidates.

Figure 16:
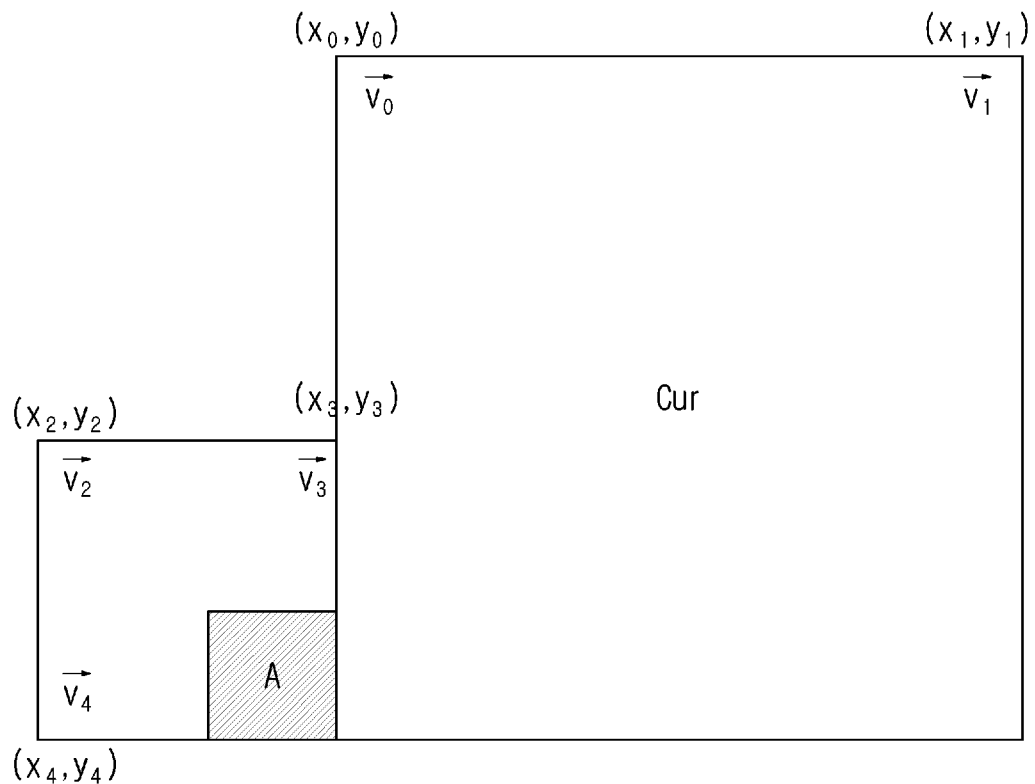
FIG. 16 is a view illustrating a CPMV derived from a neighboring block.

FIG. 16 is a view illustrating a control point motion vector (CPMV) derived from a neighboring block.

For example, a maximum of two inherited affine merge candidates may be derived, each of which may be derived based on at least one of left neighboring blocks and top neighboring blocks. Neighboring blocks for deriving the inherited affine merge mode will be described with reference to FIG. 8. An inherited affine merge candidate derived based on a left neighboring block is derived based on at least one of A0 or A1, and an inherited affine merge candidate derived based on a top neighboring block may be derived based on at least one of B0, B1 or B2. In this case, the scan order of the neighboring blocks may be A0 to A1 and B0, B1 and B2, but is not limited thereto. For each of the left and top, an inherited affine merge candidates may be derived based on an available first neighboring block in the scan order. In this case, redundancy check may not be performed between candidates derived from the left neighboring block and the top neighboring block.

For example, as shown in FIG. 16, when a left neighboring block A is encoded/decoded in the affine mode, at least one of motion vectors v2, v3 and v4 corresponding to the CP of the neighboring block A may be derived. When the neighboring block A is encoded/decoded through a 4-parameter affine model, the inherited affine merge candidate may be derived using v2 and v3. In contrast, When the neighboring block A is encoded/decoded through a 6-parameter affine model, the inherited affine merge candidate may be derived using v2, v3 and v4.

Figure 17:
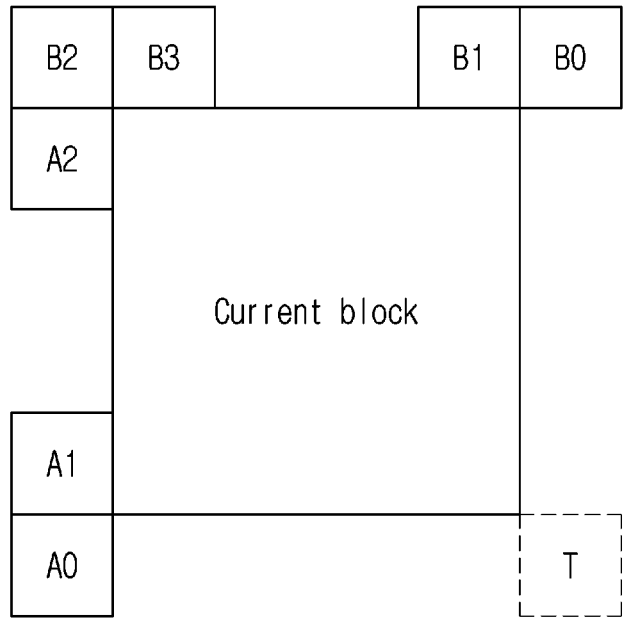
FIG. 17 is a view illustrating neighboring blocks for deriving a constructed affine merge candidate.

FIG. 17 is a view illustrating neighboring blocks for deriving a constructed affine merge candidate.

The constructed affine candidate may mean a candidate having a CPMV derived using a combination of general motion information of neighboring blocks. Motion information for each CP may be derived using spatial neighboring blocks or temporal neighboring blocks of the current block. In the following description, CPMVk may mean a motion vector representing a k-th CP. For example, referring to FIG. 17, CPMV1 may be determined to be an available first motion vector of motion vectors of B2, B3 and A2, and, in this case, the scan order may be B2, B3 and A2. CPMV2 may be determined to be an available first motion vector of motion vectors of B1 and B0, and, in this case, the scan order may be B1 and B0. CPMV3 may be determined to be one of motion vectors of A1 and A0, and, in this case, the scan order may be A1 and A0. When TMVP is applicable to the current block, CPMV4 may be determined as a motion vector of T which is a temporal neighboring block.

After four motion vectors for each CP are derived, a constructed affine merge candidate may be derived based on this. The constructed affine merge candidate may be configured by including at least two motion vectors selected from among the derived four motion vectors for each CP. For example, the constructed affine merge candidate may be composed of at least one of {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2} or {CPMV1, CPMV3} in this order. A constructed affine candidate composed of three motion vectors may be a candidate for a 6-parameter affine model. In contrast, a constructed affine candidate composed of two motion vectors may be a candidate for a 4-parameter affine model. In order to avoid the scaling process of the motion vector, when the reference picture indices of CPs are different from each other, a combination of related CPMVs may be ignored without being used to derive the constructed affine candidate.

When an affine MVP mode applies to a current block, an encoding/decoding apparatus may derive two or more CPMV predictors and CPMVs for the current block and derive CPMV differences based on them. In this case, the CPMV differences may be signaled from the encoding apparatus to the decoding apparatus. The image decoding apparatus may derive a CPMV predictor for the current block, reconstruct the signaled CPMV difference, and then derive a CPMV of the current block based on the CPMV predictor and the CPMV difference.

Meanwhile, only when the affine merge mode or a sub-block-based TMVP does not apply for the current block, an affine MVP mode may apply for the current block. Meanwhile, the affine MVP mode may be expressed as an affine CP MVP mode.

When the affine MVP applies for the current block, an affine MVP candidate list may be configured to derive a CPMV for the current block. In this case, the affine MVP candidate list may include at least one of an inherited affine MVP candidate, a constructed affine MVP candidate, a translation motion affine MVP candidate or a zero MVP candidate.

In this case, the inherited affine MVP candidate may mean a candidate derived based on the CPMVs of the neighboring blocks, when the neighboring blocks of the current block are encoded/decoded in an affine mode. The constructed affine MVP candidate may mean a candidate derived by generating a CPMV combination based on a motion vector of a CP neighboring block. The zero MVP candidate may mean a candidate composed of CPMVs having a value of 0. The derivation method and characteristics of the inherited affine MVP candidate and the constructed affine MVP candidate are the same as the above-described inherited affine candidate and the constructed affine candidate and thus a description thereof will be omitted.

When the maximum number of candidates of the affine MVP candidate list is 2, the constructed affine MVP candidate, the translation motion affine MVP candidate and the zero MVP candidate may be added when the current number of candidates is less than 2. In particular, the translation motion affine MVP candidate may be derived in the following order.

For example, when the number of candidates included in the affine MVP candidate list is less than 2 and CPMV0 of the constructed affine MVP candidate is valid, CPMV0 may be used as an affine MVP candidate. That is, affine MVP candidates having all motion vectors of CP0, CP1, CP2 being CPMV0 may be added to the affine MVP candidate list.

Next, when the number of candidates of the affine MVP candidate list is less than 2 and CPMV1 of the constructed affine MVP candidate is valid, CPMV1 may be used as an affine MVP candidate. That is, affine MVP candidates having all motion vectors of CP0, CP1, CP2 being CPMV1 may be added to the affine MVP candidate list.

Next, when the number of candidates of the affine MVP candidate list is less than 2 and CPMV2 of the constructed affine MVP candidate is valid, CPMV2 may be used as an affine MVP candidate. That is, affine MVP candidates having all motion vectors of CP0, CP1, CP2 being CPMV2 may be added to the affine MVP candidate list.

Despite the above-described conditions, when the number of candidates of the affine MVP candidate list is less than 2, a temporal motion vector predictor (TMVP) of the current block may be added to the affine MVP candidate list.

Despite addition of the translation motion affine MVP candidate, when the number of candidates of the affine MVP candidate list is less than 2, the zero MVP candidate may be added to the affine MVP candidate list.

Figure 18:
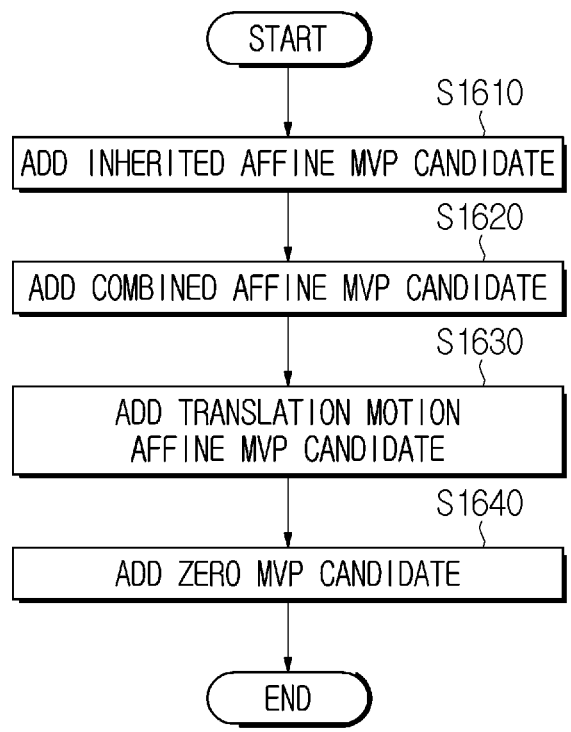
FIG. 18 is a view illustrating a method of generating an affine MVP candidate list.

FIG. 18 is a view illustrating a method of generating an affine MVP candidate list.

Referring to the flowchart of FIG. 18, candidates may be added to the affine MVP candidate list in order of an inherited affine MVP candidate (S1610), a constructed affine MVP candidate (S1620), a translation motion affine MVP candidate (S1630) and a zero MVP candidate (S1640). As described above, steps S1620 to S1640 may be performed depending on whether the number of candidates included in the affine MVP candidate list is less than 2 in each step.

The scan order of the inherited affine MVP candidates may be equal to the scan order of the inherited affine merge candidates. However, in the case of the inherited affine MVP candidate, only neighboring blocks referencing the same reference picture as the reference picture of the current block may be considered. When the inherited affine MVP candidate is added to an affine MVP candidate list, redundancy check may not be performed.

In order to derive the constructed affine MVP candidate, only spatial neighboring blocks shown in FIG. 17 may be considered. In addition, the scan order of the constructed affine MVP candidates may be equal to the scan order of the constructed affine merge candidates. In addition, in order to derive the constructed affine MVP candidate, a reference picture index of a neighboring block may be checked, and, in the scan order, a first neighboring block inter-coded and referencing the same reference picture as the reference picture of the current block may be used.

Overview of Subblock-Based TMVP (SbTMVP) Mode

Hereinafter, a subblock-based TMVP mode which is an example of an inter prediction mode will be described in detail. According to the subblock-based TMVP mode, a motion vector field (MVF) for a current block may be derived and a motion vector may be derived in units of subblocks.

Unlike a conventional TMVP mode performed in units of coding units, for a coding unit to which subblock-based TMVP mode applies, a motion vector may be encoded/decoded in units of sub-coding units. In addition, according to the conventional TMVP mode, a temporal motion vector may be derived from a collocated block, but, in the subblock-based TMVP mode, a motion vector field may be derived from a reference block specified by a motion vector derived from a neighboring block of the current block. Hereinafter, the motion vector derived from the neighboring block may be referred to as a motion shift or representative motion vector of the current block.

Figure 19:
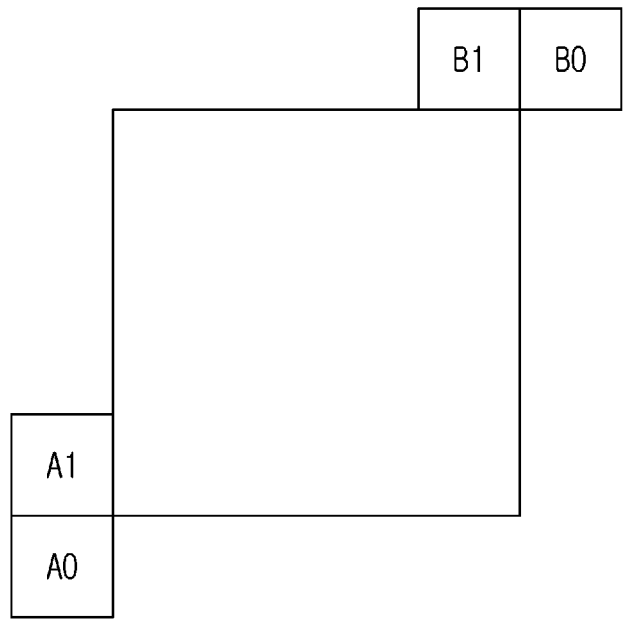
FIG. 19 is a view illustrating a neighboring block of a sub-block based TMVP mode.

FIG. 19 is a view illustrating neighboring blocks of a subblock based TMVP mode.

When a subblock-based TMVP mode applies to a current block, a neighboring block for determining a motion shift may be determined. For example, scan for the neighboring block for determining the motion shift may be performed in order of blocks of A1, B1, B0 and A0 of FIG. 19. As another example, the neighboring block for determining the motion shift may be limited to a specific neighboring block of the current block. For example, the neighboring block for determining the motion shift may always be determined to be a block A1. When a neighboring block has a motion vector referencing a col picture, the corresponding motion vector may be determined to be a motion shift. The motion vector determined to be the motion shift may be referred to as a temporal motion vector. Meanwhile, when the above-described motion vector cannot be derived from neighboring blocks, the motion shift may be set to (0, 0).

Figure 20:
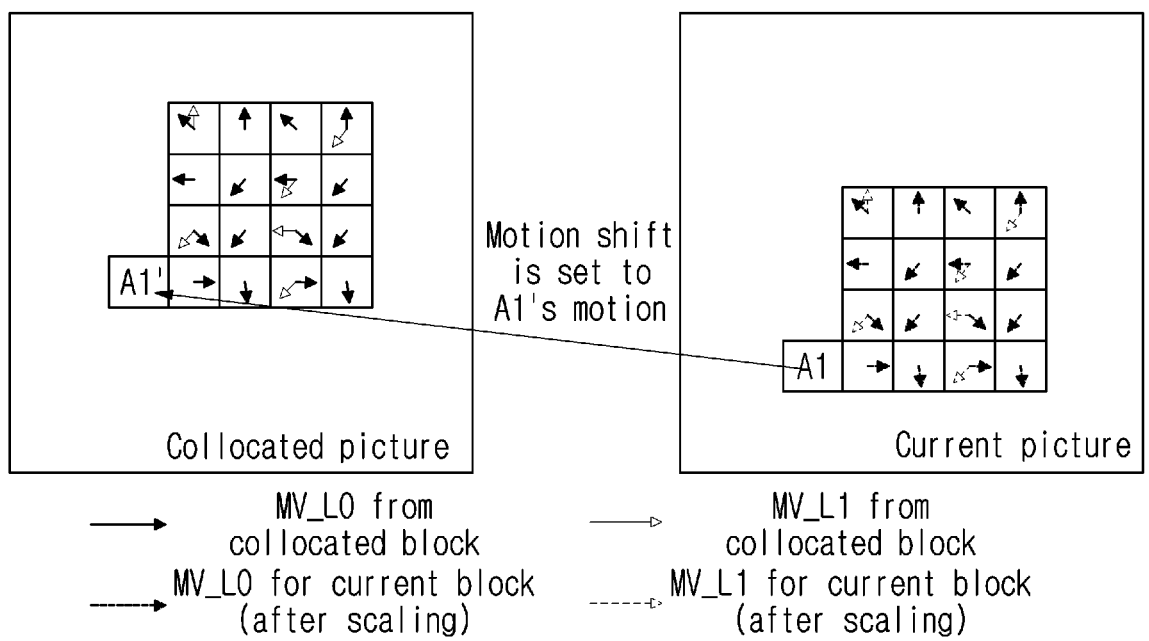
FIG. 20 is a view illustrating a method of deriving a motion vector field according to a sub-block based TMVP mode.

FIG. 20 is a view illustrating a method of deriving a motion vector field according to a subblock-based TMVP mode.

Next, a reference block on the collocated picture specified by a motion shift may be determined. For example, subblock based motion information (motion vector or reference picture index) may be obtained from a col picture by adding a motion shift to the coordinates of the current block. In the example shown in FIG. 20, it is assumed that the motion shift is a motion vector of A1 block. By applying the motion shift to the current block, a subblock in a col picture (col subblock) corresponding to each subblock configuring the current block may be specified. Thereafter, using motion information of the corresponding subblock in the col picture (col subblock), motion information of each subblock of the current block may be derived. For example, the motion information of the corresponding subblock may be obtained from the center position of the corresponding subblock. In this case, the center position may be a position of a bottom-right sample among four samples located at the center of the corresponding subblock. When the motion information of a specific subblock of the col block corresponding to the current block is not available, the motion information of a center subblock of the col block may be determined to be motion information of the corresponding subblock. When the motion vector of the corresponding subblock is derived, it may be switched to a reference picture index and a motion vector of a current subblock, similarly to the above-described TMVP process. That is, when a subblock based motion vector is derived, scaling of the motion vector may be performed in consideration of POC of the reference picture of the reference block.

As described above, the subblock-based TMVP candidate for the current block may be derived using the motion vector field or motion information of the current block derived based on the subblock.

Hereinafter, a merge candidate list configured in units of subblocks is defined as a subblock unit merge candidate list. The above-described affine merge candidate and subblock-based TMVP candidate may be merged to configure a subblock unit merge candidate list.

Meanwhile, a subblock-based TMVP mode flag specifying whether a subblock-based TMVP mode is applicable to a current block may be defined, which may be signaled at at least one level among higher levels of the current block such as a sequence, a picture, a slice, a tile, a tile group, a brick, etc. For example, the subblock-based TMVP mode flag may be named sps_sbtmvp_enabled_flag. When the subblock-based TMVP mode is applicable to the current block, the subblock-based TMVP candidate may be first added to the subblock unit merge candidate list and then the affine merge candidate may be added to the subblock unit merge candidate list. Meanwhile, a maximum number of candidates which may be included in the subblock unit merge candidate list may be signaled. For example, the maximum number of candidates which may be included in the subblock unit merge candidate list may be 5.

The size of a subblock used to derive the subblock unit merge candidate list may be signaled or preset to M×N. For example, M×N may be 8×8. Accordingly, only when the size of the current block is 8×8 or greater, an affine mode or a subblock-based TMVP mode is applicable to the current block.

Hereinafter, an embodiment of a prediction performing method of the present disclosure will be described. The following prediction performing method may be performed in step S410 of FIG. 4 or step S630 of FIG. 6.

A predicted block for a current block may be generated based on motion information derived according to a prediction mode. The predicted block (prediction block) may include prediction samples (prediction sample array) of the current block. When the motion vector of the current block specifies a fractional sample unit, an interpolation procedure may be performed and, through this, prediction samples of the current block may be derived based on reference samples in units of fractional samples within a reference picture. When affine inter prediction applies to the current block, prediction samples may be generated based on a sample/subblock unit MV. When bi-prediction applies, prediction samples derived through a weighted sum or weighted average (according to phase) of prediction samples derived based on L0 prediction (that is, prediction using MVL0 and a reference picture within a reference picture list L0) and prediction samples derived based on L1 prediction (that is, prediction using MLV1 and a reference picture within a reference picture list L1) may be used as the prediction samples of the current block. When applying bi-prediction and a reference picture used for L0 prediction and the reference picture used for L1 prediction are located in different temporal directions with respect to the current picture (that is, if it corresponds to bi-prediction and bi-directional p rediction), this may be called true bi-prediction.

In an image decoding apparatus, reconstructed samples and a reconstructed picture may be generated based on the derived prediction samples and then an in-loop filtering procedure may be performed. In addition, in an image encoding apparatus, residual samples may be derived based on the derived prediction samples and encoding of image information including prediction information and residual information may be performed.

Bi-Prediction with CU-Level Weight, BCW

When bi-prediction applies to a current block as described above, prediction samples may be derived based on a weighted average. Conventionally, the bi-prediction signal (that is, bi-prediction samples) was able to be derived through a simple average of an L0 prediction signal (L0 prediction samples) and an L1 prediction signal (L1 prediction samples). That is, bi-prediction samples was derived through an average of the L0 prediction samples based on an L0 reference picture and MVL0 and L1 prediction samples based on an L1 reference picture and MVL1. However, according to the present disclosure, when applying bi-prediction, a bi-prediction signal (bi-prediction samples) may be derived through a weighted average of the L0 prediction signal and the L1 prediction signal as follows.

$$P_{bi\text{-}pred} = ((8-w)*P_0 + w*P_1 + 4) \gg 3 \quad \text{[Equation 3]}$$

In Equation 3 above, $P_{bi\text{-}pred}$ denotes a bi-prediction signal (bi-prediction block) derived by a weighted average and $P_0$ and $P_1$ respectively denote L0 prediction samples (L0 prediction block) and L1 prediction samples (L1 prediction block). In addition, (8-w) and w denote weights applying to $P_0$ and $P_1$, respectively.

In generating the bi-prediction signal by the weighted average, five weights may be allowed. For example, the weight w may be selected from {-2,3,4,5,10}. For each bi-predicted CU, the weight w may be determined by one of two methods. As the first method of the two methods, when a current CU is not a merge mode (non-merge CU), a weight index may be signaled along with a motion vector difference. For example, a bitstream may include information on the weight index after information on the motion vector difference. As the second method of the two methods, when the current CU is a merge mode (merge CU), the weight index may be derived from neighboring blocks based on a merge candidate index (merge index).

Generation of the bi-prediction signal by the weighted average may be limited to apply to only a CU having a size including 256 or more samples (luma component samples). That is, bi-prediction by the weighted average may be performed only with respect to a CU in which a product of the width and height of the current block is 256 or more. In addition, the weight w may be used as one of five weights as described above and one of different numbers of weights may be used. For example, according to the characteristics of the current image, five weights may be used for a low-delay picture and three weights may be used for a non-low-delay picture. In this case, the three weights may be {3,4,5}.

The image encoding apparatus may determine a weight index without significantly increasing complexity, by applying a fast search algorithm. In this case, the fast search algorithm may be summarized as follows. Hereinafter, an unequal weight may mean that weights applying to $P_0$ and $P_1$ are not equal. In addition, an equal weight may mean that weights applying to $P_0$ and $P_1$ may be equal.

In the case where an AMVR mode in which resolution of a motion vector is adaptively changed is applied together, when a current picture is a low-delay picture, only the unequal weight may be conditionally checked for each of 1-pel motion vector resolution and 4-pel motion vector resolution.

In the case where an affine mode is applied together and the affine mode is selected as an optimal mode of the current block, the image encoding apparatus may perform affine motion estimation (ME) for each unequal weight.

When two reference pictures used for bi-prediction are equal, only an unequal weight may be conditionally checked.

The unequal weight may not be checked when a predetermined condition is satisfied. The predetermined picture may be based on a POC distance between a current picture and a reference picture, a quantization parameter (QP), a temporal level, etc.

A weight index of BCW may be encoded using one context coded bin and one or more subsequent bypass coded bins. The first context coded bin specifies whether an equal weight is used. When an unequal weight is used, additional bins may be bypass-encoded and signaled. The additional bins may be signaled to specify which weight is used.

Weighted prediction (WP) is a tool for efficiently encoding an image including fading. According to weighted prediction, weighting parameters (weight and offset) may be signaled for each reference picture included in each of reference picture lists L0 and L1. Then, when motion compensation is performed, weight(s) and offset(s) may apply to corresponding reference picture(s). Weighted prediction and BCW may be used for different types of images. In order to avoid interaction between weighted prediction and BCW, a BCW weight index may not be signaled for a CU using weighted prediction. In this case, the weight may be inferred to be 4. That is, an equal weight may be applied.

In the case of a CU to which a merge mode applies, a weight index may be inferred from neighboring blocks based on a merge candidate index. This may apply to both a general merge mode and an inherited affine merge mode.

In the case of a constructed affine merge mode, affine motion information may be configured based on motion information of a maximum of three blocks. In this case, the following process may be performed to derive a BCW weight index for a CU using a constructed affine merge mode.

(1) First, the range of the BCW weight index {0,1,2,3,4} may be divided into three groups {0}, {1,2,3} and {4}. When the BCW weight index of all CPs are derived from the same group, the BCW weight index may be derived by step (2) below. Otherwise, the BCW weight index may be set to 2.

(2) When at least two CPs have the same BCW weight index, the same BCW weight index may be allocated as a weight index of a constructed affine merge candidate. Otherwise, the weight index of the constructed affine merge candidate may be set to 2.

Bi-directional Optical Flow (BDOF)

According to the present disclosure, BDOF may be used to refine a bi-prediction signal. BDOF is to generate prediction samples by calculating refined motion information when bi-prediction applies to a current block (e.g., CU). Accordingly, a process of calculating refined motion information by applying BDOF may be included in the above-described motion information derivation step.

For example, BDOF may apply at a 4×4 sub-block level. That is, BDOF may be performed within the current block in units of 4×4 sub-blocks.

BODF may, for example, apply to a CU satisfying the following conditions.

1) The height of the CU is not 4 and the size of the CU is not 4×8
2) The CU is not in an affine mode or ATMVP merge mode
3) The CU is encoded in a true bi-prediction mode, that is, one of two reference pictures precedes a current picture in temporal order and the other follows the current picture in temporal order In addition, BDOF may apply only to a luma component. However, the present disclosure is not limited thereto and BDOF may apply to a chroma component or both a luma component and a chroma component.

A BDOF mode is based on the concept of optical flow. That is, it is assumed that motion of an object is smooth. When applying BDOF, for each 4×4 sub-block, a motion refinement ($v_x$, $v_y$) may be calculated. The motion refinement may be calculated by minimizing a difference between an L0 prediction sample and an L1 prediction sample. The motion refinement may be used to adjust bi-predicted sample values within a 4×4 sub-block.

Hereinafter, a process of performing BDOF will be described in greater detail.

First, horizontal gradients $$\frac{\partial I^{(k)}}{\partial x}(i, j)$$

and vertical gradients $$\frac{\partial I^{(k)}}{\partial y}(i, j)$$

of two prediction signals may be calculated. In this case, k may be 0 or 1. The gradients may be calculated as shown in Equation 4 below by directly calculating a difference between two adjacent samples.

$$\frac{\partial I^{(k)}}{\partial x}(i, j) = (I^{(k)}(i+1, j) - I^{(k)}(i-1, j)) \gg 4 \quad \text{[Equation 4]}$$
$$\frac{\partial I^{(k)}}{\partial y}(i, j) = (I^{(k)}(i, j+1) - I^{(k)}(i, j-1)) \gg 4$$

In Equation 4 above, $I^{(k)}(i,j)$ denotes a sample value of coordinates (i, j) of a prediction signal in a list k (k=0, 1). For example, $I^{(0)}(i,j)$ may denote a sample value at a position (i, j) in an L0 prediction block, and $I^{(1)}(i,j)$ may denote a sample value at a position (i, j) in an L1 prediction block.

In Equation 4 above, a difference between two samples is right-shifted by 4. However, the present disclosure is not limited thereto and the right shift shift1 may be determined based on a bit depth of a luma component. For example, when the bit depth of the luma component is bitDepth, shift1 may be determined to be max(6, bitDepth-6) or may simply be determined to be a fixed value of 6. In Equation 4 above, for gradient calculation, a difference between two samples was first calculated and then right shift operation applied to the difference. However, the present disclosure is not limited thereto and the gradients may be calculated by applying right shift operation to two sample values and then calculating a difference between right-shifted values.

As described above, after calculating the gradients, auto-correlation and cross-correlation $S_1$, $S_2$, $S_3$, $S_5$ and $S_6$ between the gradients may be calculated as follows.

$$S_1 = \sum_{(i,j)\in\Omega} \psi_x(i, j)\cdot\psi_x(i, j), \quad \text{[Equation 5]}$$
$$S_3 = \sum_{(i,j)\in\Omega} \theta(i, j)\cdot\psi_x(i, j)$$
$$S_2 = \sum_{(i,j)\in\Omega} \psi_x(i, j)\cdot\psi_y(i, j)$$
$$S_5 = \sum_{(i,j)\in\Omega} \psi_y(i, j)\cdot\psi_y(i, j)$$
$$S_6 = \sum_{(i,j)\in\Omega} \theta(i, j)\cdot\psi_y(i, j)$$

where $$\psi_x(i, j) = \left(\frac{\partial I^{(1)}}{\partial x}(i, j) + \frac{\partial I^{(0)}}{\partial x}(i, j)\right) \gg n_a$$
$$\psi_y(i, j) = \left(\frac{\partial I^{(1)}}{\partial y}(i, j) + \frac{\partial I^{(0)}}{\partial y}(i, j)\right) \gg n_a$$
$$\theta(i, j) = (I^{(1)}(i, j) \gg n_b) - (I^{(0)}(i, j) \gg n_b)$$

where $\Omega$ is a 6×6 window around the 4×4 sub-block.

The motion refinement ($v_x$, $v_y$) may be derived as follows using the above-described auto-correlation and cross-correlation between the gradients.

$$v_x = S_1 > 0?\text{clip3}(-th'_{BIO}, th'_{BIO}, -((S_3 \cdot 2^{n_b-n_a}) \gg \lfloor\log_2 S_1\rfloor)):0$$
$$v_y = S_5 > 0?\text{clip3}(-th'_{BIO}, th'_{BIO}, -((S_6 \cdot 2^{n_b-n_a} - ((v_x S_{2,m})\ll n_{s_2} + v_x S_{2,s})/2) \gg \lfloor\log_2 S_5\rfloor)):0 \quad \text{[Equation 6]}$$

where $S_{2,m}=S_2 \gg n_{s_2}$, $S_{2,s}=S_2 \& (2^{n_s}2-1)$, $th'_{BIO}=2^{13-BD}$. and $\lfloor\cdot\rfloor$ is the floor function.

Based on the derived motion refinement and gradients, the following adjustment may be performed with respect to each sample in the 4×4 sub-block.

$$b(x, y) = rnd\left(\left(v_x\left(\frac{\partial I^{(1)}(x, y)}{\partial x} - \frac{\partial I^{(0)}(x, y)}{\partial x}\right)\right)/2\right) + rnd\left(\left(v_y\left(\frac{\partial I^{(1)}(x, y)}{\partial y} - \frac{\partial I^{(0)}(x, y)}{\partial y}\right)\right)/2\right) \quad \text{[Equation 7]}$$

Finally, prediction samples $pred_{BDOF}$ of a CU, to which BDOF applies, may be calculated by adjusting the bi-prediction samples of the CU as follows.

$$pred_{BDOF}(x,y) = (I^{(0)}(x,y) + I^{(1)}(x,y) + b(x,y) + o_{offset}) \gg \text{sift} \quad \text{[Equation 8]}$$

In above Equations, $n_a$, $n_b$ and $n_{S2}$ may be 3, 6 and 12, respectively. These values may be selected such that a multiplier does not exceed 15 bits in the BDOF process and bit-widths of intermediate parameters are maintained within 32 bits.

Figure 21:
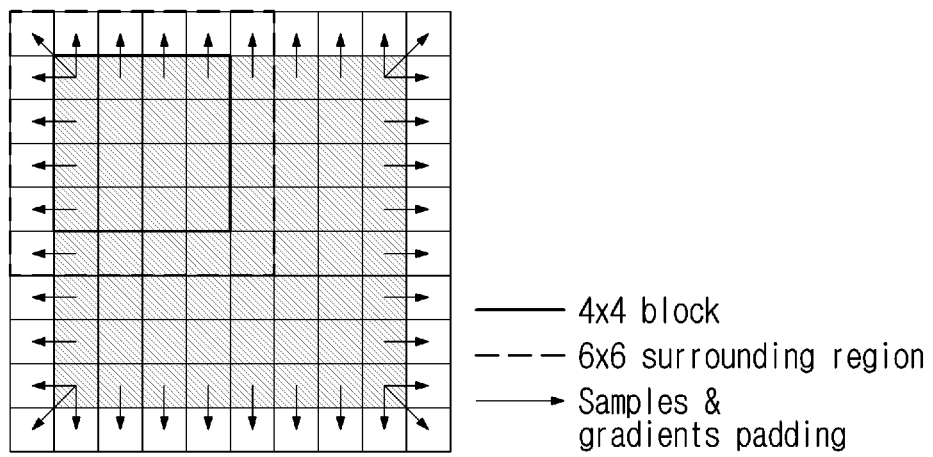
FIG. 21 is a view illustrating a CU extended to perform BDOF.

In order to derive a gradient value, prediction samples $I^{(k)}(i, j)$ in a list k (k=0, 1) existing outside a current CU may be generated. FIG. 21 is a view illustrating a CU extended to perform BDOF.

As shown in FIG. 21, in order to perform BDOF, rows/columns extending around the boundary of a CU may be used. In order to control computational complexity for generating prediction samples outside the boundary, prediction samples in an extended region (white region in FIG. 21) may be generated using a bilinear filter, and prediction samples in a CU (gray region in FIG. 21) may be generated using a normal 8-tap motion compensation interpolation filter. The sample values at the extended positions may be used only for gradient calculation. When sample values and/or gradient values located outside the CU boundary are required to perform the remaining steps of the BDOF process, nearest neighboring sample values and/or gradient values may be padded (repeated) and used.

When the width and/or height of the CU are greater than 16 luma samples, the corresponding CU may be split into sub-blocks having a width and/or height of 16 luma samples. The boundary of the sub-blocks may be treated in the same manner as the above-described CU boundary in the BDOF process. A maximum unit size in which the BDOF process is performed may be limited to 16×16.

When BCW is available for a current block, for example, when a BCW weight index specifies an unequal weight, BDOF may not apply. Similarly, when WP is available for the current block, for example, when luma_weight_lx_flag for at least one of two reference pictures is 1, BDOF may not apply. In this case, luma_weight_lx_flag may be information specifying whether weighting factors of WP for a luma component of lx prediction (x being 0 or 1) is present in a bitstream or information specifying whether WP applies to a luma component of lx prediction. When the CU is encoded in an SMVD mode, BDOF may not apply.

Prediction Refinement with Optical Flow (PROF)

Hereinafter, a method of refining a sub-block based affine motion compensation-predicted block by applying optical flow will be described. Prediction samples generated by performing sub-block based affine motion compensation may be refined based on a difference derived by an optical flow equation. Refinement of such prediction samples may be called prediction refinement with optical flow (PROF) in the present disclosure. By PROF, inter prediction of pixel level granularity may be achieved without increasing bandwidth of memory access.

Parameters of an affine motion model may be used to derive a motion vector of each pixel in a CU. However, since pixel based affine motion compensation prediction causes high complexity and an increase in bandwidth of memory access, sub-block based affine motion compensation prediction may be performed. When sub-block based affine motion compensation prediction is performed, the CU may be split into 4×4 sub-blocks and a motion vector may be determined for each sub-block. In this case, the motion vector of each sub-block may be derived from CPMVs of the CU. Sub-block based affine motion compensation has a trad-off relationship between encoding efficiency and complexity and bandwidth of memory access. Since a motion vector is derived in units of sub-blocks, complexity and bandwidth of memory access are reduced but prediction accuracy is lowered.

Accordingly, motion compensation of refined granularity may be achieved through refinement by applying optical flow to sub-block based affine motion compensation prediction.

As described above, luma prediction samples may be refined by adding a difference derived by an optical flow equation after performing sub-block based affine motion compensation. More specifically, PROF may be performed in the following four steps.

Step 1) A predicted sub-block I(i, j) is generated by performing sub-block based affine motion compensation.

Step 2) Spatial gradients $g_x(i, j)$ and $g_y(i, j)$ of the predicted sub-block is calculated at each sample position. In this case, a 3-tap filter may be used, and filter coefficient may be [−1, 0, 1]. For example, the spatial gradients may be calculated as follows.

$$g_x(i,j)=I(i+1,j)-I(i-1,j)$$

$$g_y(i,j)=I(i,j+1)-I(i,j-1) \qquad \text{[Equation 9]}$$

To calculate the gradients, predicted sub-blocks may extend by one pixel on each side. In this case, to lower memory bandwidth and complexity, pixels of extended boundaries may be copied from closest integer pixels in a reference picture. Accordingly, additional interpolation for a padding region may be skipped.

Step 3) Luma prediction refinement (ΔI(i, j)) may be calculated by an optical flow equation. For example, the following equation may be used.

$$\Delta I(i,j)=g_x(i,j)*\Delta v_x(i,j)+g_y(i,j)*\Delta v_y(i,j) \qquad \text{[Equation 10]}$$

In the above equation, Δv(i, j) denotes a difference between a pixel motion vector (pixel MV, v(i, j)) calculated at a sample position (i, j) and a sub-block MV of a sub-block, to which a sample (i, j) belongs.

Figure 22:
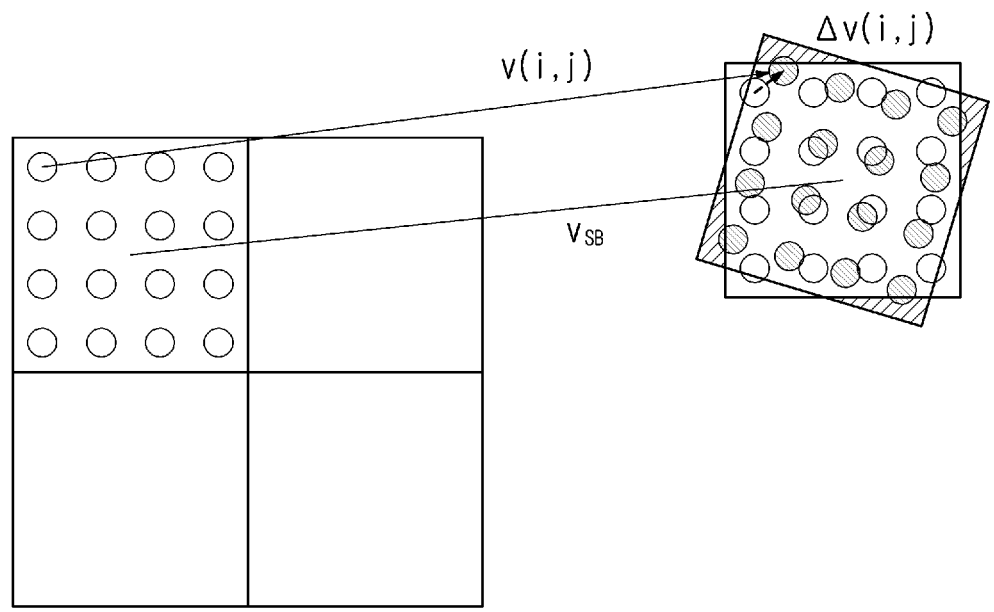
FIG. 22 is a view illustrating a relationship among $\Delta v(i, j)$, $v(i, j)$ and a subblock motion vector.

FIG. 22 is a view illustrating a relationship among Δv(i, j), v(i, j) and a sub-block motion vector.

In the example shown in FIG. 22, for example, a difference between a motion vector v(i, j) at a top-left sample position of a current sub-block and a motion vector $v_{SB}$ of the current sub-block may be represented by a thick dotted arrow, and a vector represented by the thick dotted arrow may correspond to Δv(i, j).

Affine model parameters and pixel positions from the center of the sub-block are not changed. Accordingly, Δv(i, j) may be calculated only for a first sub-block and may be reused for the other sub-blocks in the same CU. Assuming that a horizontal offset and a vertical offset from the pixel position to the center of the sub-block are respectively x and y, Δv(x, y) may be derived as follows.

$$\begin{cases} \Delta v_x(x, y) = c*x + d*y \\ \Delta v_y(x, y) = e*x + f*y \end{cases} \qquad \text{[Equation 11]}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

In the above, $(v_{0x}, v_{0y})$, $(v_{1x}, v_{1y})$ and $(v_{2x}, v_{2y})$ respectively correspond to a top-left CPMV, a top-right CPMV and a bottom-left CPMV, and w and h respectively denote the width and height of the CU.

Step 4) Finally, a final prediction block I'(i, j) may be generated based on the calculated luma prediction refinement ΔI(i, j) and the predicted sub-block I(i, j). For example, a final prediction block I' may be generated as follows.

$$I'(i,j)=I(i,j)+\Delta I(i,j) \quad \text{[Equation 12]}$$

As described above, by applying BDOF in an inter prediction process to refine a reference sample in a motion compensation process, it is possible to increase compression performance of an image. BDOF may be performed in a normal mode. That is, BDOF is not performed in case of an affine mode, a GPM mode or a CIIP mode.

PROF may be performed on a block encoded in an affine mode, as a method similar to BDOF. As described above, by refining a reference sample in each 4×4 sub-block through PROF, it is possible to increase compression performance of an image.

Since both PROF and BDOF use characteristics of optical flow, whether to apply PROF may be determined according to conditions similar to the application conditions of BDOF. According to the present disclosure, various embodiments of WP and BCW may be provided.

In the present disclosure, setting or deriving any information (e.g., flag) to or as true may mean that the corresponding information is derived as a first value (e.g., '1'). In addition, when any information is set to true, it may indicate that a process (e.g., BDOF, PROF, WP, etc.) specified by the corresponding information is performed. Conversely, in the present disclosure, setting or deriving any information (e.g., flag) to or as false may mean that the corresponding information is derived as a second value (e.g., '0'). In addition, when any information is set to false, it may indicate that a process specified by the corresponding information is not performed.

BDOF may be performed in a motion compensation process by setting bdofFlag to true when various conditions are satisfied as follows.

TABLE 1

- If all of the following conditions are true, bdofFlag is set equal to TRUE.
  - sps_bdof_enabled_flag is equal to 1 and slice_disable_bdof_dmvr_flag is equal to 0.
  - predFlagL0[ xSbIdx ][ ySbIdx ] and predFlagL1[ xSbIdx ][ ySbIdx ] are both equal to 1.
  - DiffPicOrderCnt( currPic, RefPicList[ 0 ][ refIdxL0 ] ) * DiffPicOrderCnt( currPic, RefPicList[ 1 ][ refIdxL1 ] ) is less than 0.
  - MotionModelIdc[ xCb ][ yCb ] is equal to 0.
  - merge_subblock_flag[ xCb ][ yCb ] is equal to 0.
  - sym_mvd_flag[ xCb ][ yCb ] is equal to 0.
  - ciip_flag[ xCb ][ yCb ] is equal to 0.
  - BcwIdx[ xCb ][ yCb ] is equal to 0.
  - luma_weight_l0_flag[ refIdxL10 ] and luma_weight_l1_flag[ refIdxL1 ] are both equal to 0.
  - cbWidth is greater than or equal to 8.
  - cbHeight is greater than or equal to 8.
  - cbHeight * cbWidth is greater than or equal to 128.
  - For X being each of 0 and 1, the pic_width_in_luma_samples and ic_height_in_luma_samples of the reference picture refPicLX associated with the refIdxLX are equal to the pic_width_in_luma_samples and pic_height_in_luma_samples of the current picture, respectively.
  - cIdx is equal to 0.

The conditions for performing BDOF described in Table 1 above may be described as in Table 2 below.

TABLE 2

- Information specifying whether BDOF is available at an SPS or slice level specifies "available"
- The mode of a current CU is a TRUE bi-prediction mode
- The mode of the current CU is not an affine mode, a subblock merge mode, or a SMVD or CIIP mode
- WP and BCW do not apply to the current CU
- Both the width and height of the current CU are equal to or greater than 8 and the current CU includes 128 samples
- The widths and heights of the current picture and the reference picture are the same
- Luma component However, the conditions for performing BDOF are not limited to me examples of Tables 1 and 2 above, and some of the conditions may be omitted. In addition, conditions other than the above conditions may be additionally considered.

When BDOF does not apply to the current block according to the above conditions, for example, when the prediction mode of the current block is an affine mode, PROF is applicable similarly to BDOF. For example, when the prediction mode of the current block is an affine mode, whether to apply PROF (cbProfFlagLX) may be determined and, when cbProfFlagLX is true, PROF may be performed.

In BDOF, the offset of the sample is determined using the characteristics of optical flow. Accordingly, when the brightness values of the reference pictures are different, that is, when applying BCW or weighted prediction (WP), BDOF is not performed. However, PROF may be performed without considering whether to apply BCW or WP, in spite of deriving the offset of the sample using the characteristics of optical flow.

According to an embodiment of the present disclosure, PROF may not apply to a block to which BCW or WP applies, for harmonization between BDOF and PROF from a design point of view. For example, when BcwIdx is not 0, when luma_weight_l0_flag[refIdxL0] is 1 or when luma_weight_l1_flag[refIdxL1] s 1, information cbProfFlagLX specifying whether to apply PROF may be set to false. BcwIdx being not 0 may mean that BCW applies to the current block, and luma_weight_lX_flag[refIdxLX](X=0 or 1) being 1 may mean that WP applies to the current block. In the present disclosure, BcwIdx being 0 may mean that an equal weight applies, that is, a bi-prediction block is generated by average sum of an L0 prediction block and an L1 prediction block. Accordingly, when cbProfFlagLX is set, if BCW or WP applies to the current block, control may be performed not to apply PROF, by adding the above conditions.

The following table shows an example of setting cbProfFlagLX according to the present disclosure and underlined parts show the added conditions.

TABLE 3

The variable cbProfFlagLX is derived as follows:
- If one or more of the following conditions are true. cbProfFlagLX is set equal to FALSE.
  - sps_affine_prof_enabled_flag is equal to 0.
  - fallbackModeTriggered is equal to 1.
  - numCpMv is equal to 2 and cpMvLX[ 1 ][ 0 ] is equal to cpMvLX[ 0 ][ 0 ] and cpMvLX[ 1 ][ 1 ] is equal to cpMvLX[ 0 ][ 1 ].
  - numCpMv is equal to 3 and cpMvLX[ 1 ][ 0 ] is equal to cpMvLX[ 0 ][ 0 ] and cpMvLX[ 1 ][ 1 ] is equal to cpMvLX[ 0 ][ 1 ] and cpMvLX[ 2 ][ 0 ] is equal to cpMvLX[ 0 ][ 0 ] and cpMvLX[ 2 ][ 1 ] is equal to cpMvLX[ 0 ][ 1 ].
  - <u>BcwIdx[ xCb ][ yCb ] is not equal to 0.</u>
  - <u>luma_weight_l0_flag[ refIdxL0 ] is equal to 1 or luma_weight_l1_flag[ refIdxL1 ] is equal to 1.</u>
Otherwise, cbProfFlagLX set equal to TRUE.

The following table shows another example of setting cbProfFlagLX according to the present disclosure and underlined parts show the added conditions.

TABLE 4

The variable cbProfFlagLX is derived as follows:
- If one or more of the following conditions are true, cbProfFlagLX is set equal to FALSE.
  - sps_affine_prof_enabled_flag is equal to 0.
  - fallbackModeTriggered is equal to 1.
  - numCpMv is equal to 2 and cpMvLX[ 1 ][ 0 ] is equal to cpMvLX[ 0 ][ 0 ] and cpMvLX[ 1 ][ 1 ] is equal to cpMvLX[ 0 ][ 1 ].
  - numCpMv is equal to 3 and cpMvLX[ 1 ][ 0 ] is equal to cpMvLX[ 0 ][ 0 ] and cpMvLX[ 1 ][ 1 ] is equal to cpMvLX[ 0 ][ 1 ] and cpMvLX[ 2 ][ 0 ] is equal to cpMvLX[ 0 ][ 0 ] and cpMvLX[ 2 ][ 1 ] is equal to cpMvLX[ 0 ][ 1 ].
  - <u>BcwIdx[ xCb ][ yCb ] is not equal to 0.</u>
  - <u>slice_type is equal to P and pps_weighted_pred_flag is equal to 1.</u>
  - <u>slice_type is equal to B and pps_weighted_bipred_flag is equal to 1.</u>
Otherwise, cbProfFlagLX set equal to TRUE.

As described above, whether to apply PROF to the current block may be determined. For example, cbProfFlagLX (X=0 or 1) may represent whether to apply PROF to an L0 prediction direction or an L1 prediction direction, and, according to the method of Table 3, cbProfFlagLX may be determined based on at least one of bcwIdx, luma_weighted_l0_flag and/or luma_weighted_l1_flag. As another example, according to the method of Table 4, cbProfFlagLX may be determined based on at least one of bcwIdx, slice_type, pps_weighted_pred_flag, and/or pps_weighted_bipred_flag. The slice_type specifies a slice type of a current slice, to which a current picture belongs, pps_weighted_pred_flag is a picture parameter set (PPS) parameter specifying whether WP applies to a P slice referencing the corresponding PPS, and pps_weighted_bipred_flag is a picture parameter set (PPS) parameter specifying whether WP applies to a B slice referencing the corresponding PPS.

According to another embodiment of the present disclosure, PROF may apply when BCW or WP (explicit weighted prediction) is performed.

In general, a BCW weight index (bcw_idx) is signaled only when WP is not available. Accordingly, bcw_idx and weight factors of WP are not simultaneously signaled. The following table shows an example of a syntax structure for signaling bcw_idx.

TABLE 5

```
if( sps_bcw_enabled_flag && inter_pred_idc[ x0 ][ y0 ] = =
PRED_BI &&
    luma_weight_l0_flag[ ref_idx__l0 [ x0 ][ y0 ] ] = = 0 &&
    luma_weight_l1 flag[ ref_idx__l1 [ x0 ][ y0 ] ] = = 0 &&
    chroma_weight_l0_flag[ ref_idx__l0 [ x0 ] [ y0 ] ] = = 0 &&
    chroma_weight_l1_flag[ ref_idx__l1 [ x0 ][ y0 ] ] = = 0 &&
    cbWidth * cbHeight >= 256 )
    bcw_idx[ x0 ][ y0 ]                                    ae(v)
```

According to Table 5 above, as a condition in which bcw_idx is signaled, whether all weighted prediction flags (e.g., luma_weight_l0_flag, luma_weight_l1_flag, luma_weight_l0_flag, chroma_weight_l0_flag, chroma_weight_l1_flag of reference pictures specified by reference picture indices (ref_idxl0, ref_idx_l1) of the corresponding CU are 0 is checked. Accordingly, according to Table 5, even if WP application flags (e.g., pps_weighted_pred_flag and/or pps_weighted_bipred_flag) transmitted at PPS are TRUE, when the weighted prediction flag of a specific reference picture index is 0, bcw_idx may be signaled. That is, according to the example of Table 5, bcw_idx may be signaled even though WP applies.

Figure 23:
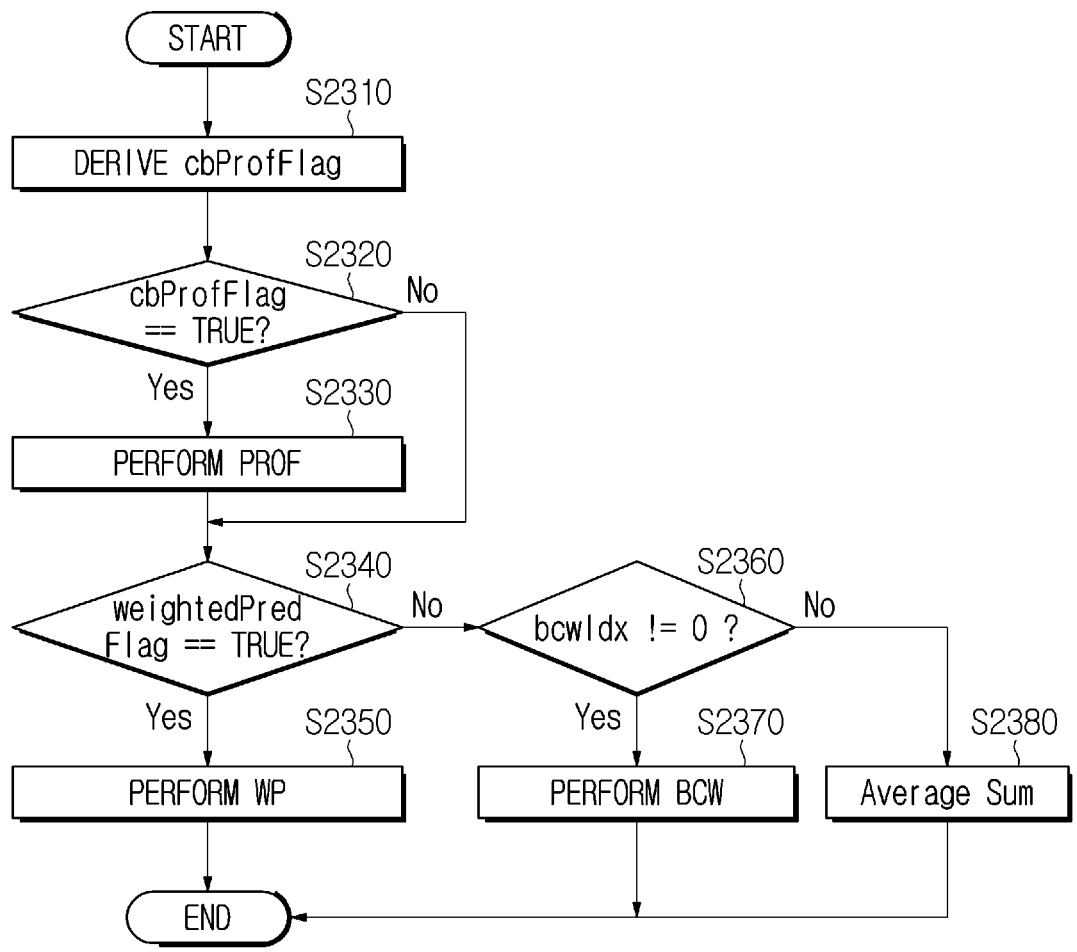
FIG. 23 is a flowchart illustrating an example of performing PROF, BCW, WP and/or average sum according to the present disclosure.

FIG. 23 is a flowchart illustrating an example of performing PROF, BCW, WP and/or average sum according to the present disclosure.

Referring to FIG. 23, first, cbProfFlag (e.g., cbProfFlagLX) specifying whether PROF applies for the current block may be derived (S2310). cbProfFlag may be derived based on various methods of the present disclosure.

Thereafter, in step S2320, whether cbProfFlag is TRUE may be checked and, if it is TRUE, PROF may be performed on the current block in step S2330. PROF may be performed according to the above-described method and a refined prediction sample for the current block may be obtained as a result of performing PROF. In step S2320, when cbProfFlag is False, step S2330 may be skipped.

Thereafter, in step S2340, weightedPredFlag specifying whether weighted prediction (WP) applies for the current block may be derived and whether the value thereof is TRUE may be checked. A method of deriving weightedPredFlag will be described later. When weightedPredFlag is TRUE, it may be determined that weighted prediction applies for the current block, and weighted prediction may be performed on the current block (S2350). Weighted prediction on the current block may be performed based on weighting parameters (weight and offset) for the reference picture of the current block. As described above, the weighting parameters for the reference picture may be explicitly signaled through a bitstream.

When weightedPredFlag is False, it may be determined that weighted prediction does not apply for the current block and whether bcwIdx is 0 may be checked (S2360). bcwIdx may be differently derived according to the prediction mode of the current block. For example, when the prediction mode of the current bock is a skip mode or a merge mode, bcwIdx for the current block may be derived as bcwIdx for a merge candidate specified by a merge candidate index of the current block. When the prediction mode of the current block is not a merge mode, for example, an MVP mode, bcwIdx for the current block may be reconstructed by parsing a syntax element bcw_idx signaled through a bitstream. If bcw_idx is not signaled through the bitstream, the value of bcwIdx may be inferred to be 0. When bcwIdx is 0, it may specify that BCW may not apply for the current block. As described above, bcwIdx being 0 may mean that an equal weight applies, that is, mean that a bi-prediction block is generated by average sum of an L0 prediction block and an L1 prediction block.

In step S2360, when bcwIdx is not 0, it may be determined that BCW applies for the current block, and BCW may be performed on the current block based on a weight specified by bcwIdx (S2370). In step S2360, when bcwIdx is 0, it may be determined that BCW does not apply for the current block and average sum may be performed on the current block (S2380).

Table 6 shows an example of deriving weightedPredFlag and performing WP or BCW accordingly according to the present disclosure.

TABLE 6

The variable weightedPredFlag is derived as follows:
 - If slice_type is equal to P, weightedPredFlag is set equal to
   pps_weighted_pred_flag.
 - Otherwise (slice_type is equal to B), weightedPredFlag is set equal to
   pps_weighted_bipred_flag.
The following applies:
 - If weightedPredFlag is equal to 0, the array pbSamples of the prediction
   samples is derived by invoking the default weighted sample prediction
   process as specified in clause 8.5.6.6.2 with the coding block width
   nCbW, the coding block height nCbH, two (nCbW)x(nCbH) arrays
   predSamplesL0 and predSamplesL1, the prediction list utilization flags TABLE 6-continued predFlagL0 and predFlagL1, the bi-prediction weight index bcwIdx and
the bit depth bitDepth as inputs.
//default weighted prediction
Otherwise (weightedPredFlag is equal to 1), the array pbSamples of the
prediction samples is derived by invoking the weighted sample prediction
process as specified in clause 8.5.6.6.3 with the coding block width nCbW, the
coding block height nCbH, two (nCbW)x(nCbH) arrays predSamplesL0 and
predSamplesL1, the prediction list utilization flags predFlagL0 and predFlagL1,
the reference indices refIdxL0 and refIdxL1, the colour component index cIdx
and the bit depth bitDepth as inputs. //explicit weighted prediction According to the method of Table 6, weightedPredFlag may be derived based on a slice type of a current slice, to which the current block belongs, and a WP application flag (e.g., pps_weighted_pred_flag, pps_weighted_bipred_flag) signaled through a PPS. Specifically, when the slice type of the current block is a P slice, weightedPredflag may be determined to be a value of pps_weighted_pred_flag. In addition, when the slice type of the current block is a B slice, weightedPredflag may be determined to be a value of pps_weighted_bipred_flag.

According to the method of Table 6, when weightedPredFlag determined as described above is false, default weighted prediction is performed and, when bcwIdx is not 0, BCW or when bcwIdx is 0, average sum may be performed. In addition, when weightedPredFlag is true, explicit weighted prediction may be performed based on the signaled weighting parameters.

According to the method of Table 6, weightedPredFlag is determined only by the slice type of the current slice and PPS information instead of the weighted prediction flags (e.g., luma_weight_l0_flag, luma_weight_l1_flag, chroma_weight_l0_flag, chroma_weight_l1_flag) for each reference picture, whereas bcw_idx may be signaled based on the weighted prediction flags (e.g., luma_weight_l0_flag, luma_weight_l1_flag, chroma_weight_l0_flag, chroma_weight_l1_flag for each reference picture, as shown in Table 5.

Accordingly, even when weightedPredFlag is determined to be TRUE according to the method of Table 6, bcw_idx may be signaled. In this case, even when bcw_idx is not 0 (default), WP (explicit weighted prediction) is always performed.

The embodiment described with reference to FIG. 23 and Tables 5 and 6 has a problem that WP is performed even when bcw_idx is not the default. Hereinafter, another embodiment of the present disclosure for solving the above problem will be described.

Figure 24:
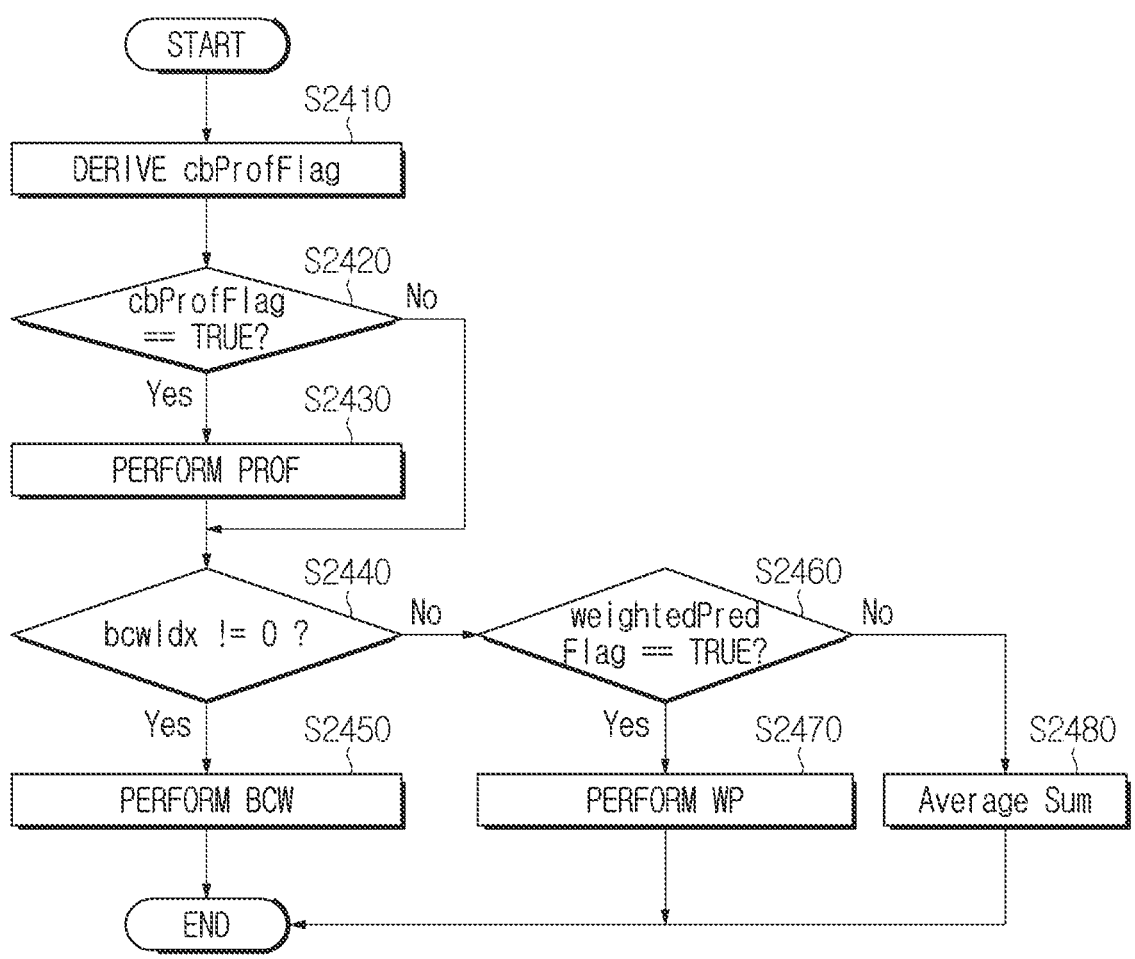
FIG. 24 is a flowchart illustrating another example of performing PROF, BCW, WP and/or average sum according to the present disclosure.

FIG. 24 is a flowchart illustrating another example of performing PROF, BCW, WP and/or average sum according to the present disclosure.

Referring to FIG. 24, first, cbProfFlag specifying whether PROF applies for a current block may be derived (S2410). cbProfFlag may be derived based on various methods of the present disclosure.

Thereafter, in step S2420, whether cbProfFlag is TRUE may be checked, and, when it is TRUE, in step S2430, PROF may be performed on the current block. PROF may be performed according to the above-described method, and a refined prediction sample for the current block may be obtained as a result of performing PROF. In step S2420, when cbProfFlag is False, step S2430 may be skipped.

Thereafter, in step S2440, whether bcwIdx is 0 may be checked. bcwIdx may be differently derived according to a prediction mode of the current block. For example, when the prediction mode of the current bock is a skip mode or a merge mode, bcwIdx for the current block may be derived as bcwIdx for a merge candidate specified by a merge candidate index of the current block. When the prediction mode of the current block is not a merge mode, for example, an MVP mode, bcwIdx for the current block may be reconstructed by parsing a syntax element bcw_idx signaled through a bitstream. If bcw_idx is not signaled through the bitstream, the value of bcwIdx may be inferred to be 0. In step S2440, when bcwIdx is not 0, it may be determined that BCW applies for the current block, and BCW may be performed on the current block based on a weight specified by bcwIdx (S2450).

In step S2440, when bcwIdx is 0, it may be determined that BCW does not apply for the current block and, thereafter, in step S2460, weightedPredFlag specifying whether weighted prediction (WP) applies for the current block is TRUE may be checked.

In step S2460, when weightedPredFlag is TRUE, it may be determined that weighted prediction applies for the current block, and weighted prediction may be performed on the current block (S2470). Weighted prediction on the current block may be performed based on weighting parameters (weight and offset) for the reference picture of the current block. As described above, the weighting parameters for the reference picture may be explicitly signaled through a bitstream.

When weightedPredFlag is False in step S2460, it may be determined that weighted prediction does not apply for the current block and average sum may be performed on the current block (S2480).

According to the embodiment described with reference to FIG. 24, when both explicit weighted prediction (WP) and BCW are applicable for the current block, BCW may preferentially apply.

Table 7 shows another example of deriving weightedPredFlag and performing WP or BCW accordingly according to the present disclosure.

TABLE 7

The variable weightedPredFlag is derived as follows:
- If slice_type is equal to P, weightedPredFlag is set equal to
  pps_weighted_pred_flag.
- Otherwise (slice_type is equal to B), weightedPredFlag is set equal to
  pps_weighted_bipred_flag.

TABLE 7-continued

The following applies:
- If weightedPredFlag is equal to 0 or BcwIdx is not equal to 0, the array pbSamples of the prediction samples is derived by invoking the default weighted sample prediction process as specified in clause 8.5.6.6.2 with the coding block width nCbW, the coding block height nCbH, two (nCbW)x(nCbH) arrays predSamplesL0 and predSamplesL1, the prediction list utilization flags predFlagL0 and predFlagL1, the bi-prediction weight index bcwIdx and the bit depth bitDepth as inputs.
  //default weighted prediction
- Otherwise (weightedPredFlag is equal to 1 and BcwIdx is equal to 0), the array pbSamples of the prediction samples is derived by invoking the weighted sample prediction process as specified in clause 8.5.6.6.3 with the coding block width nCbW, the coding block height nCbH, two (nCbW)x(nCbH) arrays predSamplesL0 and predSamplesL1, the prediction list utilization flags predFlagL0 and predFlagL1, the reference indices refIdxL0 and refIdxL1, the colour component index cIdx and the bit depth bitDepth as inputs.
//explicit weighted prediction A method of deriving weightedPredFlag is the same in the method of Table 6 and the method of Table 7 and thus a detailed description thereof will be omitted. According to the method of Table 7, when weightedPredFlag determined as described above is false or bcwIdx is not 0, default weighted prediction may be performed, and BCW or average sum may be performed according to the value of bcwIdx. In addition, when weightedPredFlag is true and bcwIdx is 0, explicit weighted prediction may be performed based on the signaled weighting parameters.

According to the method of Table 7, when weightedPredFlag is true and bcwIdx is not 0, that is, when both explicit weighted prediction (WP) and BCW are applicable for the current block, BCW may preferentially apply.

Figure 25:
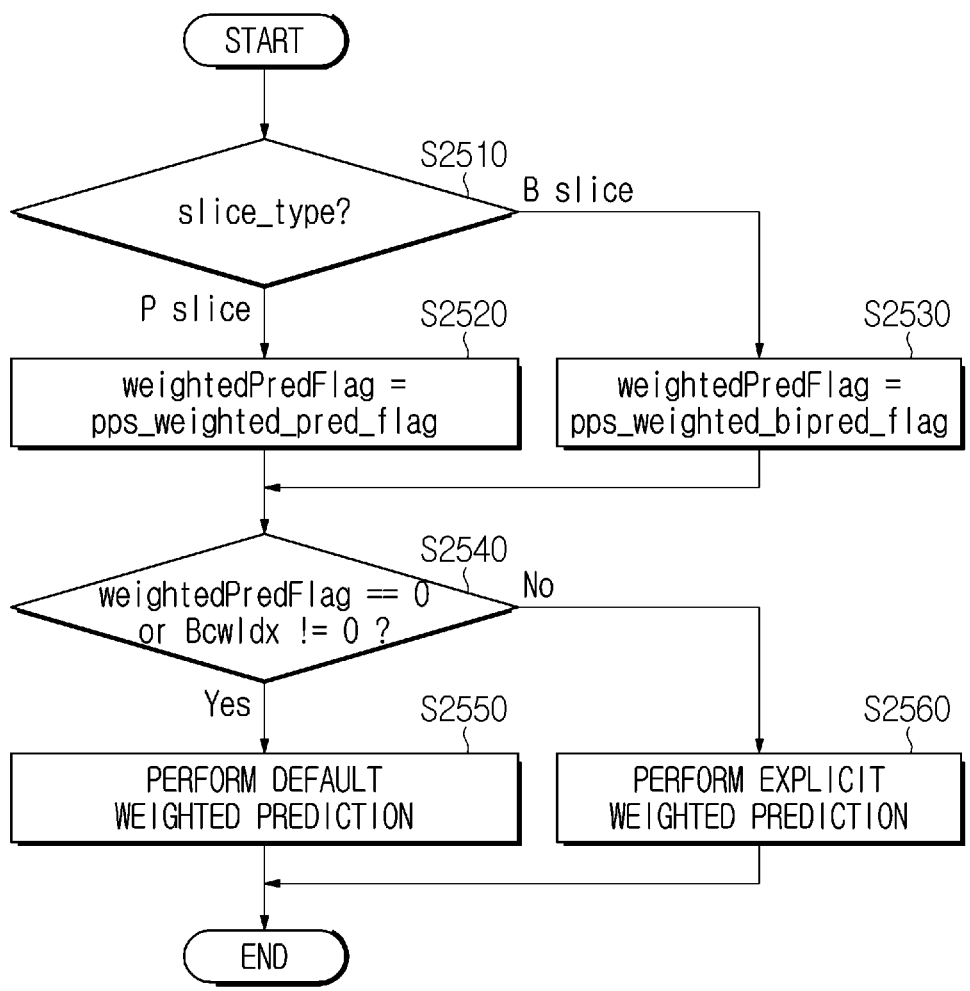
FIG. 25 is a flowchart illustrating an example of performing BCW or WP according to the method of Table 7.

FIG. 25 is a flowchart illustrating an example of performing BCW or WP according to the method of Table 7.

First, a slice type of a current slice, to which a current block belongs, may be determined (S2510). When the slice type is a P slice, weightedPredFlag may be derived as pps_weighted_pred_flag (S2520). When the slice type is a B slice, weightedPredFlag may be derived as pps_weighted_bipred_flag (S2530).

Thereafter, in step S2540, whether weightedPredFlag is 0 or whether BcwIdx is not 0 may be determined. bcwIdx may be differently derived according to a prediction mode of the current block. For example, when the prediction mode of the current bock is a skip mode or a merge mode, bcwIdx for the current block may be derived as bcwIdx for a merge candidate specified by a merge candidate index of the current block. When the prediction mode of the current block is not a merge mode, for example, an MVP mode, bcwIdx for the current block may be reconstructed by parsing a syntax element bcw_idx signaled through a bitstream. If bcw_idx is not signaled through the bitstream, the value of bcwIdx may be inferred to be 0.

When weightedPredFlag is 0 or when BcwIdx is not 0, default weighted prediction may be performed (S2550). In this case, when BcwIdx is 0, average sum described in step S2380 or S2480 may be performed. When BcwIdx is not 0, BCW described in step S2370 or step S2450 may be performed.

When weightedPredFlag is not 0 and BcwIdx is 0, explicit weighted prediction may be performed (S2560). In this case, WP described in step S2350 or step S2470 may be performed.

Table 8 shows another example of deriving weightedPredFlag and performing WP or BCW accordingly according to the present disclosure.

TABLE 8

The variable weightedPredFlag is derived as follows:
- If BcwIdx is not equal to 0, weightedPredFlag is set equal to 0.
- Otherwise (BcwIdx is equal to 0). weightedPredFlag is derived as follows:
  - If slice_type is equal to P, weightedPredFlag is set equal to pps_weighted_pred_flag
  Otherwise (slice_type is equal to B), weightedPredFlag is set equal to pps_weighted_bipred_flag.
The following applies:
- If weightedPredFlag is equal to 0, the array pbSamples of the prediction samples is derived by invoking the default weighted sample prediction process as specified in clause 8.5.6.6.2 with the coding block width nCbW, the coding block height nCbH, two (nCbW)x(nCbH) arrays predSamplesL0 and predSamplesL1, the prediction list utilization flags predFlagL0 and predFlagL1, the bi-prediction weight index bcwIdx and the bit depth bitDepth as inputs.
  //default weighted prediction
Otherwise (weightedPredFlag is equal to 1), the array pbSamples of the prediction samples is derived by invoking the weighted sample prediction process as specified in clause 8.5.6.6.3 with the coding block width nCbW, the coding block height nCbH, two (nCbW)x(nCbH) arrays predSamplesL0 and predSamplesL1, the prediction list utilization flags predFlagL0 and TABLE 8-continued predFlagL1, the reference indices refIdxL0 and refIdxL1, the colour
component index cIdx and the bit depth bitDepth as inputs. //explicit weighted
prediction According to the method of Table 8, weightedPredFlag may be derived by further considering bcwIdx. Specifically, when bcwIdx for the current block is not 0, weightedPredFlag may be derived as false. When bcwIdx for the current block is 0, weightedPredFlag may be derived based on a slice type of a current slice, to which the current block belong, and WP application flags (e.g., pps_weighted_pred_flag, pps_weighted_bipred_flag) signaled through a PPS according to the method of Table 6. According to the method of Table 8, when weightedPredFlag determined as described above is false (second value, e.g., 0), default weighted prediction is performed, and BCW or average sum may be performed according to the value of bcwIdx. In addition, when weightedPredFlag is true (first value, e.g., 1), explicit weighted prediction may be performed based on the signaled weighting parameters.

According to the method of Table 8, when bcwIdx is not 0, by deriving weightedPredFlag as false, BCW may preferentially apply when both explicit weighted prediction (WP) and BCW are applicable for the current block.

Figure 26:
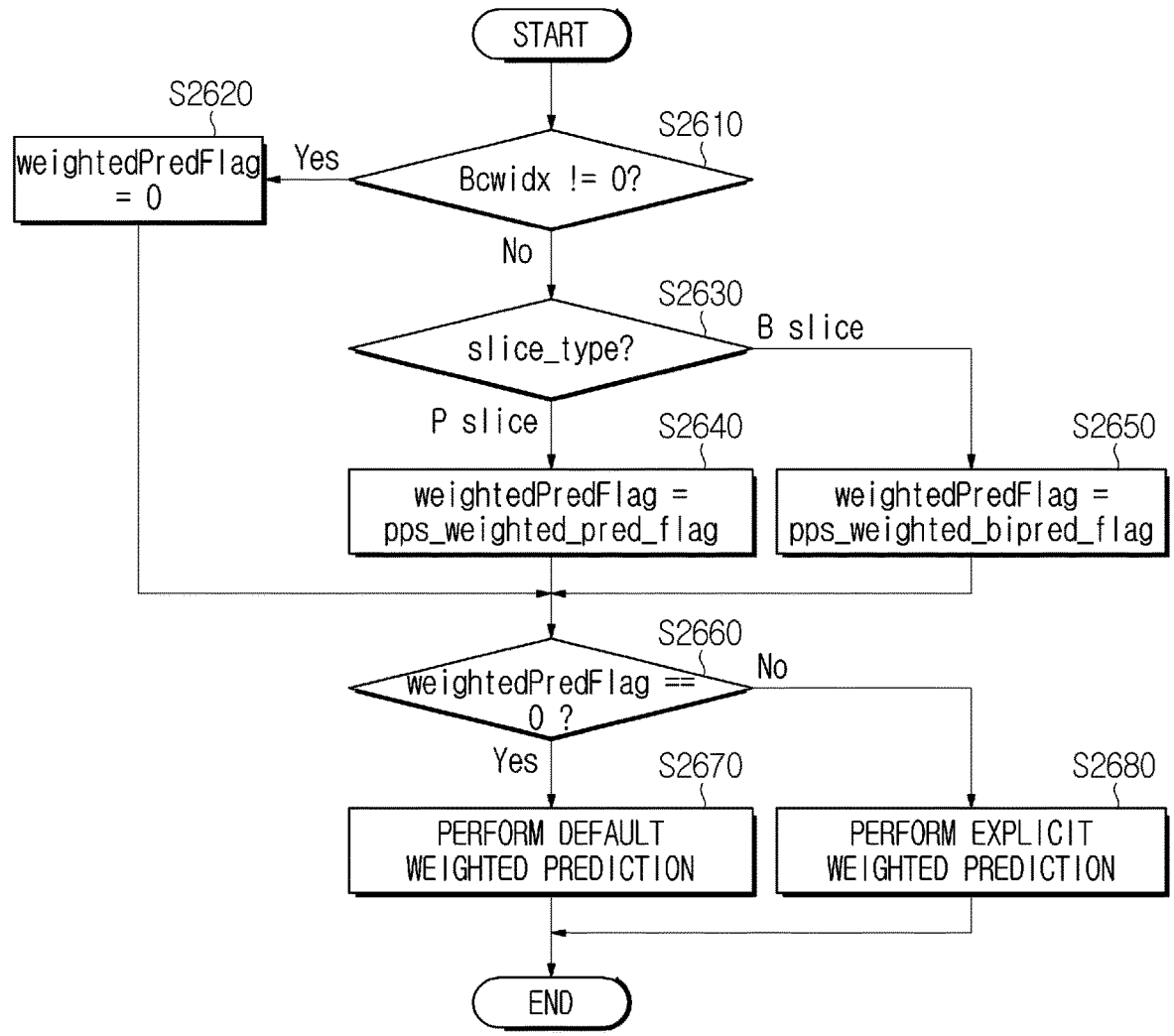
FIG. 26 is a flowchart illustrating an example of performing BCW or WP according to the method of Table 8.

FIG. 26 is a flowchart illustrating an example of performing BCW or WP according to the method of Table 8.

First, whether BcwIdx is not 0 may be determined (S2610). bcwIdx may be differently derived according to a prediction mode of a current block. For example, when the prediction mode of the current bock is a skip mode or a merge mode, bcwIdx for the current block may be derived as bcwIdx for a merge candidate specified by a merge candidate index of the current block. When the prediction mode of the current block is not a merge mode, for example, an MVP mode, bcwIdx for the current block for the current block may be reconstructed by parsing a syntax element bcw_idx signaled through a bitstream. If bcw_idx is not signaled through the bitstream, the value of bcwIdx may be inferred to be 0.

When BcwIdx is not 0, weightedPredFlag may be derived as 0 (S2620). Thereafter, default weighted prediction may be performed through determination of step S2660 (S2670). Alternatively, step S2620 and step S2660 may be skipped and step S2670 may be immediately performed. Step S2670 is performed in the same manner as step S2550 and thus a detailed description thereof will be omitted.

When BcwIdx is 0, a slice type of a current slice, to which the current block belongs, may be determined (S2630). When the slice type is a P slice, weightedPredFlag may be derived as pps_weighted_pred_flag (S2640). When the slice type is a B slice, weightedPredFlag may be derived as pps_weighted_bipred_flag (S2650).

Thereafter, in step S2660, whether weightedPredFlag is 0 may be determined.

When weightedPredFlag is 0, default weighted prediction may be performed (S2670). When weightedPredFlag is not 0, explicit weighted prediction may be performed (S2680). Step S2670 and step S2680 are respectively performed in the same manner as step S2550 and step S2560 and thus a detailed description thereof will be omitted.

Table 9 shows another example of deriving weightedPredFlag and performing WP or BCW accordingly according to the present disclosure.

TABLE 9

The variable weightedPredFlag is derived as follows:
- If slice_type is equal to P the following applies:
  - If one or more following conditions are true, weightedPredFlag is set
    equal to 1,
    - luma_weight_l0_flag[ refIdxL0 ] is not equal to 0.
    - chroma_weight_l0_flag[ refIdxL0 ] is not equal to 0.
  - Otherwise, weightedPredFlag is set equal to 0.
- Otherwise (slice_type is equal to B), the following applies:
  - If one or more following conditions are true, weightedPredFlag is set
    equal to 1.
    - luma_weight_l0_flag[ refIdxL0 ] is not equal to 0.
    - luma_weight_l1_flag[ refIdxL1 ] is not equal to 0.
    - chroma_weight_l0_flag[ refIdxL0 ] is not equal to 0.
    - chroma_weight_l1_flag[ refIdxL1 ] is not equal to 0.
  - Otherwise, weightedPredFlag is set equal to 0.
The following applies:
  - If weightedPredFlag is equal to 0, the array pbSamples of the prediction
    samples is derived by invoking the default weighted sample prediction
    process as specified in clause 8.5.6.6.2 with the coding block width
    nCbW, the coding block height nCbH, two (nCbW)x(nCbH) arrays
    predSamplesL0 and predSamplesL1, the prediction list utilization
    flags predFlagL0 and predFlagL1, the bi-prediction weight index
    bcwIdx and the bit depth bitDepth as inputs.
    //default weighted prediction
Otherwise (weightedPredFlag is equal to 1), the array pbSamples of the
prediction samples is derived by invoking the weighted sample prediction
process as specified in clause 8.5.6.6.3 with the coding block width nCbW, the
coding block height nCbH, two (nCbW)x(nCbH) arrays predSamplesL0 and
predSamplesL1, the prediction list utilization flags predFlagL0 and TABLE 9-continued predFlagL1, the reference indices refIdxL0 and refIdxL1, the colour component index cIdx and the bit depth bitDepth as inputs. //explicit weighted prediction According to the method of Table 9, weightedPredFlag may be derived in consideration of a slice type of a current slice, to which the current block belongs, and weighted prediction flags (e.g., luma_weight_l0_flag, luma_weight_l1_flag, chroma_weight_l0_flag, chroma_weight_l1_flag) of reference pictures specified by reference picture indices (ref_idx_l0, ref_idx_l1) of the current block. Specifically, when the current slice, to which the current block belongs, is a P slice and both weighted prediction flags for an L0 direction (e.g., luma_weight_l0_flag, chroma_weight_l0_flag) are 0, weightedPredFlag may be derived as 0. In addition, when the current slice, to which the current block belongs, is a P slice and at least one of the weighted prediction flags for the L0 direction (e.g., luma_weight_l0_flag, chroma_weight_l0_flag) is not 0, weightedPredFlag may be derived as 1.

When the current slice, to which the current block belongs, is a B slice and all weighted prediction flags for an L0 direction and an L1 direction (e.g., luma_weight_l0_flag, luma_weight_l1_flag, chroma_weight_l0_flag, chroma_weight_l1_flag) are 0, weightedPredFlag may be derived as 0. In addition, when the current slice, to which the current block belongs, is a B slice and at least one of the weighted prediction flags for the L0 direction and the L1 direction (e.g., luma_weight_l0_flag, luma_weight_l1_flag, chroma_weight_l0_flag, chroma_weight_l1_flag) is not 0, weightedPredFlag may be derived as 1.

According to the method of Table 9, when weightedPredFlag determined as described above is false (second value, e.g., 0), default weighted prediction may be performed, and BCW or average sum may be performed according to the value of bcwIdx. In addition, when weightedPredFlag is true (first value, e.g., 1), explicit weighted prediction may be performed based on the signaled weighting parameters.

According to the method of Table 9, weightedPredFlag is derived based on conditions in which bcw_idx is signaled. That is, by deriving weightedPredFlag as false when bcw_idx is signaled, BCW may preferentially apply when both explicit weighted prediction (WP) and BCW are applicable for the current block.

Figure 27:
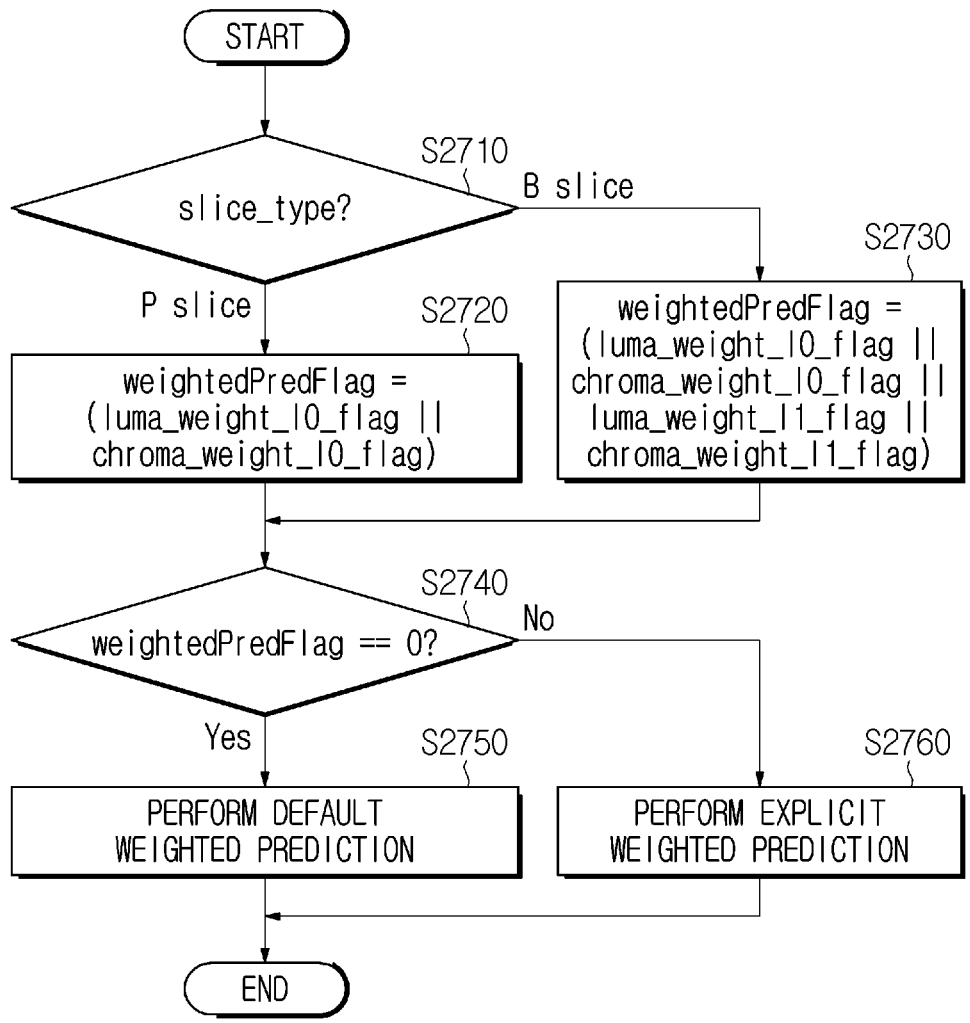
FIG. 27 is a flowchart illustrating an example of performing BCW or WP according to the method of Table 9.

FIG. 27 is a flowchart illustrating an example of performing BCW or WP according to the method of Table 9.

First, a slice type of a current slice, to which a current block belongs, may be determined (S2710). When the slice type is a P slice, weightedPredFlag may be derived based on weight_l0_flag and/or chroma_weight_l0_flag as described with reference to Table 9 (S2720). When the slice type is a B slice, weightedPredFlag may be derived based on luma_weight_l0_flag, chroma_weight_l0_flag, luma_weight_l1_flag, and/or chroma_weight_l1_flag (S2730).

Thereafter, in step S2740, whether weightedPredFlag is 0 may be determined.

When weightedPredFlag is 0, default weighted prediction may be performed (S2750). When weightedPredFlag is not 0, explicit weighted prediction may be performed (S2760). Step S2750 and step S2760 are performed in the same manner as step S2550 and step S2560, respectively, and thus a detailed description thereof will be omitted.

Table 10 shows another example of deriving weightedPredFlag and performing WP or BCW accordingly according to the present disclosure.

TABLE 10

The variable weightedPredFlag is derived as follows:
 - If slice_type is equal to P the following applies:
  - If one or more following conditions are true, weightedPredFlag is set equal
   to 1,
    - luma_weight_l0_flag[ refIdxL0 ] is not equal to 0.
    - chroma_weight_l0_flag[ refIdxL0 ] is not equal to 0.
  - Otherwise, weightedPredFlag is set equal to 0.
 - Otherwise (slice_type is equal to B). the following applies:
  - If one or more following conditions are true, weightedPredFlag is set equal
   to 1.
    - luma_weight_l0_flag[ refIdxL0 ] is not equal to 0.
    - luma_weight_l1_flag[ refIdxL1 ] is not equal to 0.
    - chroma_weight_l0_flag[ refIdxL0 ] is not equal to 0.
    - chroma_weight_l1_flag[ refIdxL1 ] is not equal to 0.
  - Otherwise, weightedPredFlag is set equal to 0.
The following applies:
 - If weightedPredFlag is equal to 0 or BcwIdx is not equal to 0, the array
  pbSamples of the prediction samples is derived by invoking the default
  weighted sample prediction process as specified in clause 8.5.6.6.2 with the
  coding block width nCbW, the coding block height nCbH, two
  (nCbW)x(nCbH) arrays predSamplesL0 and predSamplesL1, the prediction
  list utilization flags predFlagL0 and predFlagL1, the bi-prediction weight
  index bcwIdx and the bit depth bitDepth as inputs.
  //default weighted prediction
 - Otherwise (weightedPredFlag is equal to 1 and BcwIdx is equal to 0), the array
  pbSamples of the prediction samples is derived by invoking the weighted TABLE 10-continued sample prediction process as specified in clause 8.5.6.6.3 with the coding block width nCbW, the coding block height nCbH, two (nCbW)x(nCbH) arrays predSamplesL0 and predSamplesL1, the prediction list utilization flags predFlagL0 and predFlagL1, the reference indices refIdxL0 and refIdxL1, the colour component index cIdx and the bit depth bitDepth as inputs.
//explicit weighted prediction A method of deriving weightedPredFlag is the same in the method of Table 9 and the method of Table 10 and thus a detailed description thereof will be omitted. According to the method of Table 10, when weightedPredFlag determined as described above is false (second value, e.g., 0) or bcwIdx is not 0, default weighted prediction may be performed, and BCW or average sum may be performed according to the value of bcwIdx. In addition, when weightedPredFlag is true (first value, e.g., 1) and bcwIdx is 0, explicit weighted prediction may be performed based on the signaled weighting parameters.

According to the method of Table 10, weightedPredFlag is derived based on conditions in which bcw_idx is signaled. That is, by deriving weightedPredFlag as false when bcw_idx is signaled, BCW may preferentially apply when both explicit weighted prediction (WP) and BCW are applicable for the current block.

In addition, according to the method of Table 10, when weightedPredFlag is true and bcwIdx is not 0, that is, when both explicit weighted prediction (WP) and BCW are applicable for the current block, BCW may preferentially apply.

Figure 28:
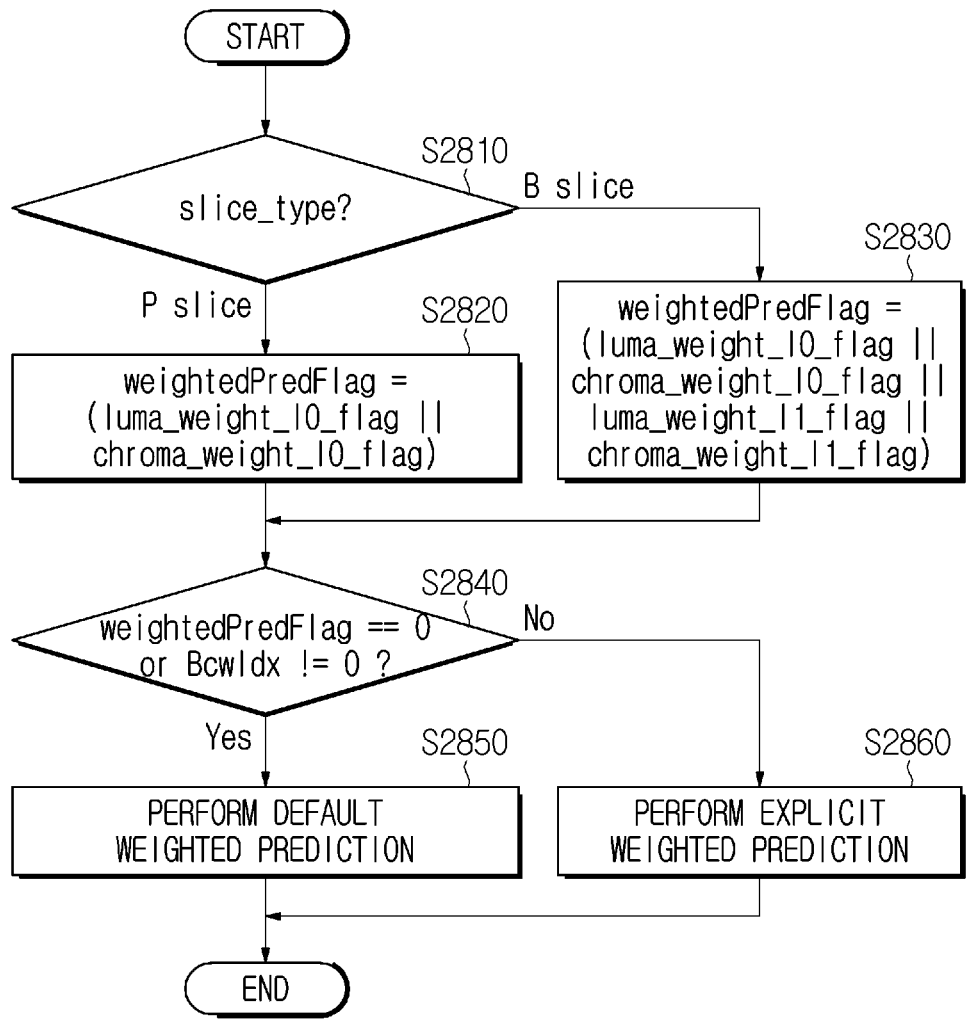
FIG. 28 is a flowchart illustrating an example of performing BCW or WP according to the method of Table 10.

FIG. 28 is a flowchart illustrating an example of performing BCW or WP according to the method of Table 10.

Step S2810 to step S2830 of FIG. 28 are respectively the same as step S2710 to step S2730 of FIG. 27 and thus a detailed description thereof will be omitted.

Referring to FIG. 28, thereafter, in step S2840, whether weightedPredFlag is 0 or whether BcwIdx is not 0 may be determined and, default weighted prediction of step S2850 or explicit weighted prediction of step S286 may be performed based on the result of determination. Step S2840 to step S2860 of FIG. 28 are respectively the same as step S2540 to step S2560 of FIG. 25 and thus a detailed description thereof will be omitted.

As described above, the embodiment described with reference to FIG. 23 and Tables 5 and 6 has problem that WP is performed even when bcw_idx is not the default. Hereinafter, another embodiment of the present disclosure for solving the above problem will be described.

PROF may apply even when BCW or WP (explicit weighted prediction) is performed. In general, since bcw_idx is parsed from a bitstream only when WP is not available, BCW and WP shall not exist at the same time. However, as shown in the syntax structure shown in Table 5, to parse bcw_idx from the bitstream, only weighted prediction flags (e.g., luma_weight_l1_flag, luma_weight_l1_flag, chroma_weight_l0_flag, chroma_weight_l1_flag) of reference pictures specified by reference picture indices of the current block are checked. In addition, as shown in Table 6, weightedPredFlag is derived based on a slice type of a current slice, to which the current block belongs, and WP application flags (e.g., pps_weighted_pred_flag, pps_weighted_bipred_flag) signaled through a PPS. Accordingly, even when the WP application flag is true, if a weighted prediction flag for a specific reference picture is 0, bcw_idx is parsed. As a result, WP and BCW may simultaneously apply.

Table 11 shows a modified syntax structure in which bcw_idx is parsed according to another example of the present disclosure.

TABLE 11 if( sps_bcw_enabled_flag && inter_pred_idc[ x0 ][ y0 ] = = PRED_BI &&
    !(slice_type == P && pps_weighted_pred_flag ) &&
!(slice_type == B && pps_weighted_bipred_flag ) &&
cbWidth * cbHeight >= 256 )
    bcw_idx[ x0 ][ y0 ]                                                        ae(v)

In the syntax structure of Table 11, since the parsing condition of bcw_idx is modified in consideration of the derivation condition of weightedPredFlag of Table 6, by deriving weightedPredFlag as false when bcw_idx is parsed and deriving weightedPredFlag as true only when bcw_idx is not parsed, the case where WP and BCW simultaneously apply may be eliminated. For example, the embodiment described with reference to FIG. 23 and Tables 5 and 6 may solve the above-described problem by replacing Table 5 with Table 11.

Figure 29:
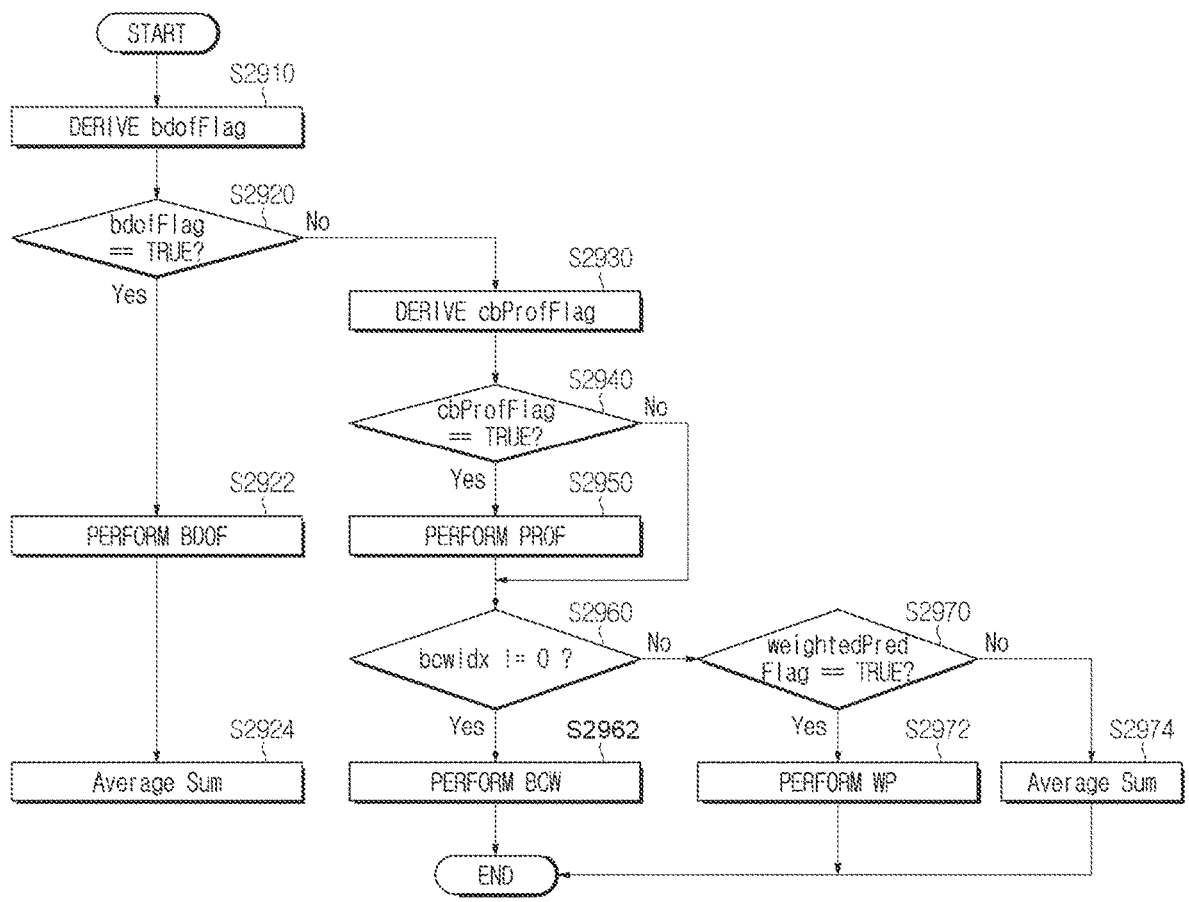
FIG. 29 is a flowchart illustrating an example of performing BDOF, PROF, BCW, WP, and/or average sum according to the present disclosure.

FIG. 29 is a flowchart illustrating an example of performing BDOF, PROF, BCW, WP, and/or average sum based on values of the bdofFlag, the weight index BcwIdx, and the weightedPredFlag.

Referring to FIG. 29, first, bdofFlag specifying whether BDOF applies for a current block may be derived (S2910).

In step S2920, when bdofFlag is TRUE, it may be determined that BDOF applies for the current block, and BDOF may be performed on the current block (S2922), and thereafter average sum may be performed on the current block (S2924).

Otherwise, when bdofFlag is False in step S2920, it may be determined that BDOF does not apply for the current block and cbProfFlag specifying whether PROF applies for a current block may be derived (S2930). cbProfFlag may be derived based on various methods of the present disclosure.

Thereafter, in step S2940, whether cbProfFlag is TRUE may be checked, and, when it is TRUE, in step S2950, PROF may be performed on the current block. PROF may be performed according to the above-described method, and a refined prediction sample for the current block may be obtained as a result of performing PROF. In step S2940, when cbProfFlag is False, step S2950 may be skipped.

Thereafter, in step S2960, whether bcwIdx is 0 may be checked. bcwIdx may be differently derived according to a prediction mode of the current block. For example, when the prediction mode of the current bock is a skip mode or a merge mode, bcwIdx for the current block may be derived as bcwIdx for a merge candidate specified by a merge candidate index of the current block. When the prediction mode of the current block is not a merge mode, for example, an MVP mode, bcwIdx for the current block may be reconstructed by parsing a syntax element bcw_idx signaled through a bitstream. If bcw_idx is not signaled through the bitstream, the value of bcwIdx may be inferred to be 0. In step S2960, when bcwIdx is not 0, it may be determined that BCW applies for the current block, and BCW may be performed on the current block based on a weight specified by bcwIdx (S2962).

In step S2960, when bcwIdx is 0, it may be determined that BCW does not apply for the current block and, thereafter, in step S2970, weightedPredFlag specifying whether weighted prediction (WP) applies for the current block is TRUE may be checked.

In step S2970, when weightedPredFlag is TRUE, it may be determined that weighted prediction applies for the current block, and weighted prediction may be performed on the current block (S2972). Weighted prediction on the current block may be performed based on weighting parameters (weight and offset) for the reference picture of the current block. As described above, the weighting parameters for the reference picture may be explicitly signaled through a bitstream.

When weightedPredFlag is False in step S2970, it may be determined that weighted prediction does not apply for the current block and average sum may be performed on the current block (S2974).

According to the embodiment described with reference to FIG. 29, when both explicit weighted prediction (WP) and BCW are applicable for the current block, BCW may preferentially apply.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 30:
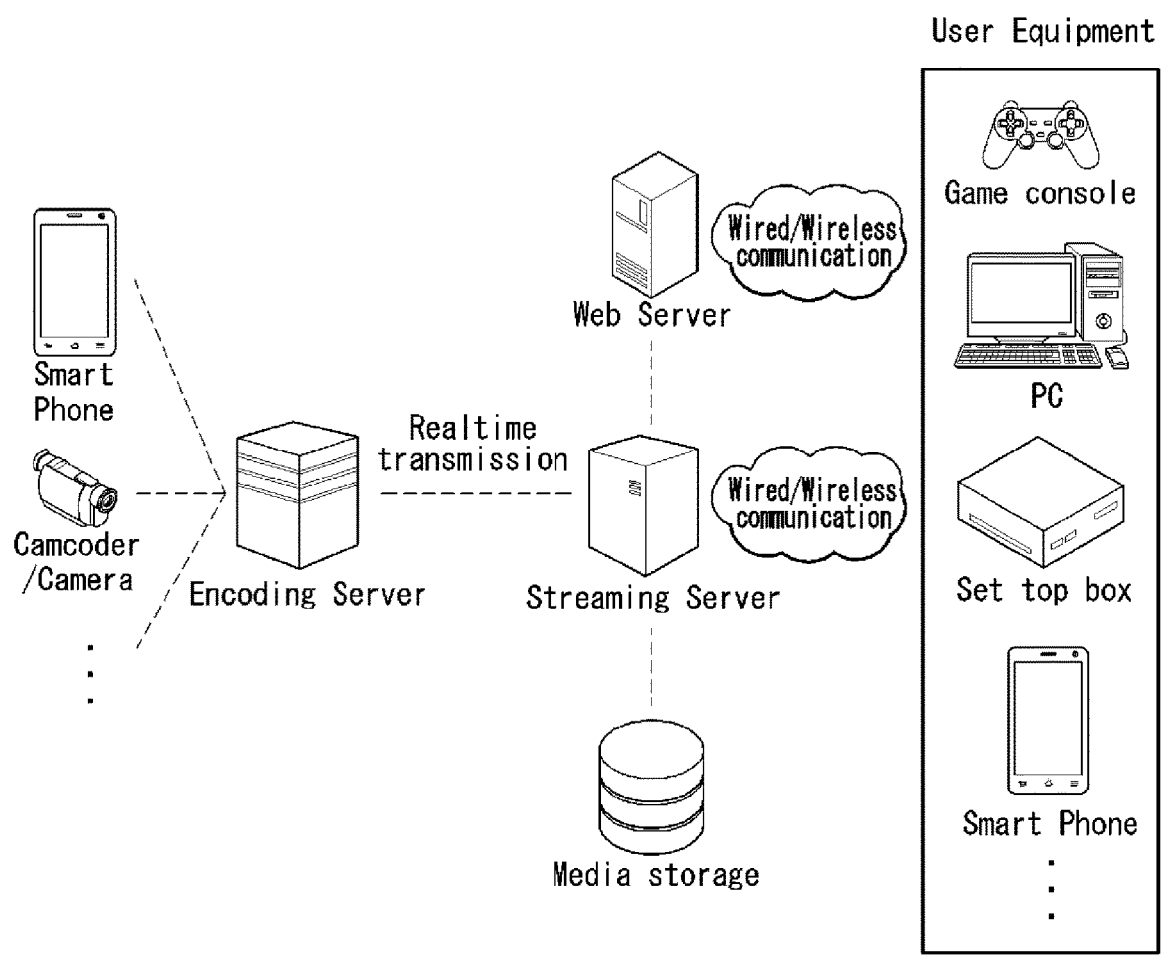
FIG. 30 is a view showing a content streaming system, to which an embodiment of the present disclosure is applicable.

FIG. 30 is a view showing a content streaming system, to which an embodiment of the present disclosure is applicable.

As shown in FIG. 30, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
   receiving a bitstream;
   deriving, based on the received bitstream, a first flag for Bi-Directional Optical Flow (BDOF) on a current block of a picture;
   based on the first flag specifying that the BDOF is to be applied to the current block: performing a BDOF process on the current block; and
   based on the first flag specifying that the BDOF is not to be applied to the current block:
      checking, based on the received bitstream, (i) a second flag for weighted prediction on the current block and (ii) a weight index BcwIdx for performing bi-prediction with CU-level weight (BCW) for the current block; and
      based on the second flag and the weight index BcwIdx, determining whether to perform default weighted prediction or explicit weighted prediction on the current block,
      wherein the default weighted prediction is performed on the current block, based on the second flag being equal to 0 or the weight index BcwIdx not being equal to 0,
      wherein the explicit weighted prediction is performed on the current block, based on the second flag being equal to 1 and the weight index BcwIdx being equal to 0, and
      wherein the second flag is determined independently of weight prediction flags for a reference picture of the current block.

2. The image decoding method of claim 1, wherein the second flag is differently determined based on a slice type of a current slice, to which the current block belongs.

3. The image decoding method of claim 2,
   wherein the second flag is derived as a value of pps_weighted_pred_flag signaled at a picture parameter set (PPS), based on the slice type of the current slice being a P slice, and
   wherein the second flag is derived as a value of pps_weighted_bipred_flag signaled at the PPS, based on the slice type of the current slice being a B slice.

4. The image decoding method of claim 1,
   wherein the weight index BcwIdx is derived based on a syntax element bcw_idx signaled through the bitstream, and
   wherein the weight index BcwIdx is derived as 0 based on the syntax element bcw_idx being not present in the bitstream.

5. The image decoding method of claim 4, wherein the syntax element bcw_idx is parsed from the bitstream based on a weighted prediction flag of a reference picture of the current block.

6. The image decoding method of claim 4, wherein the syntax element bcw_idx is parsed from the bitstream based on all weighted prediction flags of a reference picture of the current block being equal to 0.

7. The image decoding method of claim 1, wherein the default weighted prediction performs the BCW or an average sum based on the weight index BcwIdx being equal to 0.

8. The image decoding method of claim 7, wherein the default weighted prediction performs the average sum on the current block based on the weight index BcwIdx being equal to 0, and
   wherein the default weighted prediction performs the BCW on the current block based on the weight index BcwIdx not being equal to 0.

9. The image decoding method of claim 1, wherein the explicit weighted prediction is performed based on weighting parameters (weight and offset) for a reference picture of the current block.

10. The image decoding method of claim 9, wherein the weighting parameters are explicitly signaled through the bitstream.

11. An image encoding method performed by an image encoding apparatus, the image encoding method comprising:
    deriving a first flag for Bi-Directional Optical Flow (BDOF) on a current block of a picture;
    based on the first flag specifying that the BDOF is to be applied to the current block: performing a BDOF process on the current block;
    based on the first flag specifying that the BDOF is not to be applied to the current block:
       checking (i) a second flag for weighted prediction on the current block and (ii) a weight index BcwIdx for performing bi-prediction with CU-level weight (BCW) for the current block; and
       based on the second flag and the weight index BcwIdx, determining whether to perform default weighted prediction or explicit weighted prediction on the current block,
       wherein the default weighted prediction is performed on the current block, based on the second flag being equal to 0 or the weight index BcwIdx not being equal to 0,
       wherein the explicit weighted prediction is performed on the current block, based on the second flag being equal to 1 and the weight index BcwIdx being equal to 0, and
       wherein the second flag is determined independently of weight prediction flags for a reference picture of the current block; and
    encoding information related to the first flag, the second flag, and the weight index BcwIdx.

12. A non-transitory computer-readable medium storing a bitstream generated by a method, the method comprising:
    deriving a first flag for Bi-Directional Optical Flow (BDOF) on a current block of a picture;
    based on the first flag specifying that the BDOF is to be applied to the current block: performing a BDOF process on the current block;
    based on the first flag specifying that the BDOF is not to be applied to the current block:
       checking (i) a second flag for weighted prediction on the current block and (ii) a weight index BcwIdx for performing bi-prediction with CU-level weight (BCW) for the current block; and
       based on the second flag and the weight index BcwIdx, determining whether to perform default weighted prediction or explicit weighted prediction on the current block, wherein the default weighted prediction is performed on the current block, based on the second flag being equal to 0 or the weight index BcwIdx not being equal to 0, wherein the explicit weighted prediction is performed on the current block, based on the second flag being equal to 1 and the weight index BcwIdx being equal to 0, and wherein the second flag is determined independently of weight prediction flags for a reference picture of the current block; and generating the bitstream including information related to the first flag, the second flag, and the weight index BcwIdx.

\* \* \* \* \*